(12) United States Patent
Takafuji et al.

(10) Patent No.: US 7,353,087 B2
(45) Date of Patent: Apr. 1, 2008

(54) COLLISION OBJECT DISCRIMINATION APPARATUS FOR VEHICLES

(75) Inventors: Tetsuya Takafuji, Anjo (JP); Yoshiyuki Hattori, Toyoake (JP); Shinichi Kiribayashi, Anjo (JP)

(73) Assignee: DENSO Corporation, Kariya (JP)

( * ) Notice: Subject to any disclaimer, the term of this patent is extended or adjusted under 35 U.S.C. 154(b) by 642 days.

(21) Appl. No.: 10/897,370

(22) Filed: Jul. 22, 2004

(65) Prior Publication Data

US 2005/0021192 A1    Jan. 27, 2005

(30) Foreign Application Priority Data

Jul. 24, 2003 (JP) ............................. 2003-279257
Jun. 10, 2004 (JP) ............................. 2004-173056

(51) Int. Cl.
*G05D 1/00* (2006.01)
*G06F 17/00* (2006.01)

(52) U.S. Cl. ...................... 701/1; 280/728.1; 340/436

(58) Field of Classification Search .................... 701/1, 701/300–302, 45; 280/728.1, 734, 735; 180/170; 340/425.5, 435–436
See application file for complete search history.

(56) References Cited

U.S. PATENT DOCUMENTS

| | | | | |
|---|---|---|---|---|
| 5,419,407 A | * | 5/1995 | Meyer et al. | 180/274 |
| 5,547,216 A | * | 8/1996 | Iwata et al. | 280/734 |
| 5,995,892 A | * | 11/1999 | Kiribayashi et al. | 701/45 |
| 6,167,335 A | | 12/2000 | Ide et al. | |
| 6,561,301 B1 | | 5/2003 | Hattori et al. | |

FOREIGN PATENT DOCUMENTS

| | | |
|---|---|---|
| JP | 06-219226 | 8/1994 |
| JP | 11-028994 | 2/1999 |
| JP | 2001-106019 | 4/2001 |
| JP | 2001-296309 | 10/2001 |

* cited by examiner

*Primary Examiner*—Yonel Beaulieu
(74) *Attorney, Agent, or Firm*—Harness, Dickey & Pierce, PLC

(57) ABSTRACT

A collision object discrimination apparatus for vehicles includes two collision detection sensors for discriminating kinds of a collision object based on two sensor outputs. The collision object is determined based on a collision width (W) detected by a collision width detection sensor fitted to a vehicle body. Alternatively, the collision object is determined based on a difference between operation characteristics of the two sensors. Further alternatively, the two sensors are integrated into a single unit including a plurality of censor cells.

13 Claims, 28 Drawing Sheets

COLLISION OBJECT DISCRIMINATION APPARATUS FOR VEHICLES

CROSS REFERENCE TO RELATED APPLICATION

This application is based on and incorporates herein by reference Japanese Patent Applications No. 2003-279257 filed Jul. 24, 2003 and No. 2004-173056 filed Jun. 10, 2004.

FIELD OF THE INVENTION

The present invention relates to a collision object discrimination apparatus for vehicles which discriminates an object colliding against a vehicle.

BACKGROUND OF THE INVENTION

When a protection apparatus (for example, an active hood) on a vehicle front part is activated in thecase where a collision object is not a pedestrian (human being), various undesirable influences arise. For example, when discrimination from a pedestrian cannot be made in the case where a collision occurs with a light object such as a construction signboard, the protection apparatus is unnecessarily activated and a repair cost incurs.

Besides, when discrimination from a pedestrian cannot be made in the case where a collision occurs with a heavy fixture such as a concrete wall or a vehicle, the hood moves back in a state where it is raised. In this instance, the hood enters a vehicle interior and damages a passenger in the vehicle. Thus, it is conventionally requested to accurately discriminate whether or not a collision object is a pedestrian.

JP-A-11-028994 proposes to discriminate a pedestrian by using a time period (duration of continuation) when a collision load (or deformed amount) exceeds a predetermined level. U.S. Pat. No. 6,561,301 (JP-A-11-310095) proposes to discriminate a pedestrian by using an increasing rate after a collision load exceeds a predetermined level.

Another prior art proposes to discriminate a pedestrian based on a peak value of a collision load. That is, in these prior arts, a pedestrian is discriminated from another collision object based on predetermined change components of the collision load detection signal waveform.

However, the collision objects have various shapes and various rigidities. Even if they have the same speed and the same mass, waveforms of the collision load $F(=m \times a)$ vary according to these shapes and stiffness. Thus, the accurate pedestrian discrimination is difficult when only the above duration time of the collision load, the increasing rate or the peak value is used.

For example, in the case where the collision object is a wide body in the vehicle width direction (lateral direction), the deformation of a vehicle body such as a bumper in the width direction is large. As a result, the collision load per unit area (for example, unit width) acting on the collision object or the vehicle body becomes small, and the deformation in the depth direction (longitudinal direction) of the collision object or the vehicle body becomes small.

On the contrary, in the case where the width of the collision object is narrow, the collision width of the vehicle body is small (narrow). As a result, the collision load per unit area (for example, unit width) acting on the collision object or the vehicle body becomes large, and the deformation of the collision object or the vehicle body in the depth direction become large. The collision load detection signal waveform changes with the degree of the depressed deformation of the collision object or the bumper.

SUMMARY OF THE INVENTION

It is therefore an object of the present invention to provide a collision object discrimination apparatus for vehicles, which can accurately discriminate collision objects irrespective of the change of rigidities and shapes of collision objects.

According to a first aspect of the present invention, not only a collision load (including information connected with the collision load) but also an actual collision width is used to discriminate the kind of a collision object. In a collision width detection, not the collision width itself but a signal having a correlation with it may be used.

Preferably, the rigidity of the collision object is also used to discriminate the collision object. As the rigidity of the collision object, not only the rigidity of the collision object itself but a signal having a correlation with it may be used.

When the collision width is detected, the rigidity of the collision object can be detected using the collision width and the collision load. It is assumed that the rigidity of the collision object means a parameter indicating the resistance of the collision portion to deformation at the time of collision. A pedestrian, that is, a human being and another collision object are considerably different from each other in rigidity. Accordingly, when discrimination of the collision object is made based on the rigidity of the collision object, the collision object having the rigidity different from a pedestrian can be accurately discriminated from a pedestrian.

Preferably, three properties relating to a collision object, that is, mass of the collision object, its rigidity and its width are used to perform discrimination, accurate collision object discrimination becomes possible irrespective of vehicle speed. The rigidity is a deformation resistance of the collision object per unit width and is information relating to the rigidity of the collision object in which the change of the rigidity due to the collision width is corrected.

An increasing rate (increasing speed) of the collision load has a positive correlation with composite collision rigidity when the collision width is constant. That is, it has the positive correlation with the composite collision rigidity per unit collision width. Accordingly, the composite collision rigidity can be obtained from the increasing rate of the collision load and the collision width. Since the rigidity of the bumper itself in an arbitrary collision width is already known, the rigidity of the collision object can be obtained from the obtained composite rigidity and the stored bumper rigidity.

When this rigidity of the collision object is corrected by the collision width, the rigidity of the collision object independent of the collision width, that is, the deformation resistance per unit collision width can be obtained. The rigidities of the collision objects vary according to the respective collision objects. When the rigidity range of pedestrians is previously measured and stored, a pedestrian discrimination can be made based on the rigidity of the collision object.

Preferably, an arithmetic circuit part for calculating the collision width applies power supply voltage to one of both left ends of a pair of resistance lines and one of both right ends thereof, the other of both left ends of the pair of resistance lines and the other of both right ends thereof are grounded through a pair of resistance elements, respectively. The collision width is calculated based on the voltage drop of both resistance elements.

The pair of resistance lines come in electrical contact with each other at a collision portion, and the collision width is detected based on a first electric resistance value between the one end side of both resistance lines and the detected contact place and a second electric resistance value between the other end side of both resistance lines and the detected contact place. The first electric resistance value is, for example, proportional to a distance to one end of the contact area, and the second electric resistance value is, for example, proportional to a distance to the other end of the contact area. Since the whole length of the resistance line is already known, the width of the contact area is calculated by subtracting the two distances from the whole length.

According a second aspect of the present invention, a front side sensor and a rear side sensor are provided. Each of the sensors outputs a predetermined ON level when an impact force exceeds a predetermined threshold, and a predetermined OFF level when it does not exceed the threshold. The level of the collision load is determined based on the combination of these level changes, a duration time, and an ON time difference.

The collision load. (including information connected with it) is changed in accordance with the vehicle speed. Therefore, it is preferable that the detected collision load or the information connected with it is corrected in accordance with the vehicle speed, or a threshold used to compare and discriminate the detected collision load or the information connected with it is changed. Thus, the influence of the vehicle speed on the collision load is compensated.

According to a third aspect of the present invention, a collision load detection sensor includes a plurality of film-like pressure-sensitive sensors disposed on a bumper at least in a vehicle lateral direction at a predetermined pitch for respectively outputting load signals changing based on a collision load. The load signals outputted by the respective film-like pressure-sensitive sensors are added to calculate the collision load. A pedestrian or not is determined based on a detected load pattern with a stored load pattern.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be described in detail with reference to various embodiments shown in the accompanying drawings.

First Embodiment

Figure 1:
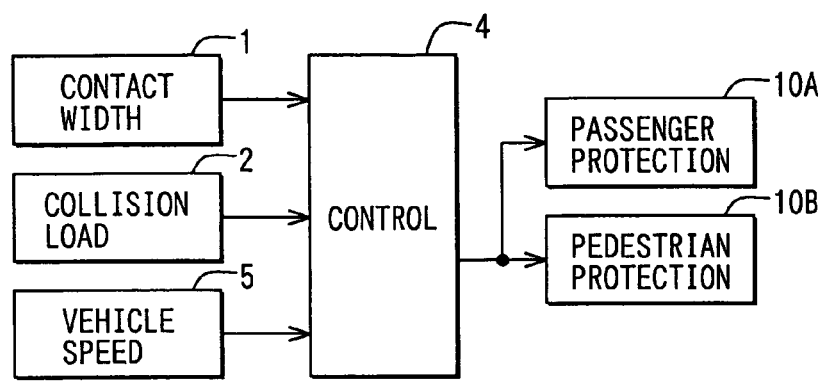
FIG. 1 is a block diagram showing a collision object discrimination apparatus for vehicles according to the first embodiment of the present invention.

Referring first to FIG. 1, a collision object determination apparatus according to a first embodiment is comprised a contact width detection sensor 1, a collision load detection sensor 2, an electronic control unit 4 and a vehicle speed sensor 5. The control unit 4 outputs information relating to collision to a passenger protection apparatus 10A and a pedestrian protection apparatus 10B. This information includes information as to whether or not a collision object is a pedestrian.

The contact width detection sensor 1 is provided as a first collision detection sensor and extends in the lateral direction at the front surface of a bumper cover 8 surrounding a bumper (absorber) 3. The collision load detection sensor 2 is provided as a second collision detection sensor and extends in the lateral direction at the rear surface of the bumper 3. The bumper 3 is provided to extend in the lateral direction at the front surface of a bumper reinforcing member 7 laterally provided in the front part of a vehicle body 6. The bumper 3, the reinforcing member 7 and the cover 8 form a part of the vehicle body 6.

Figure 3:
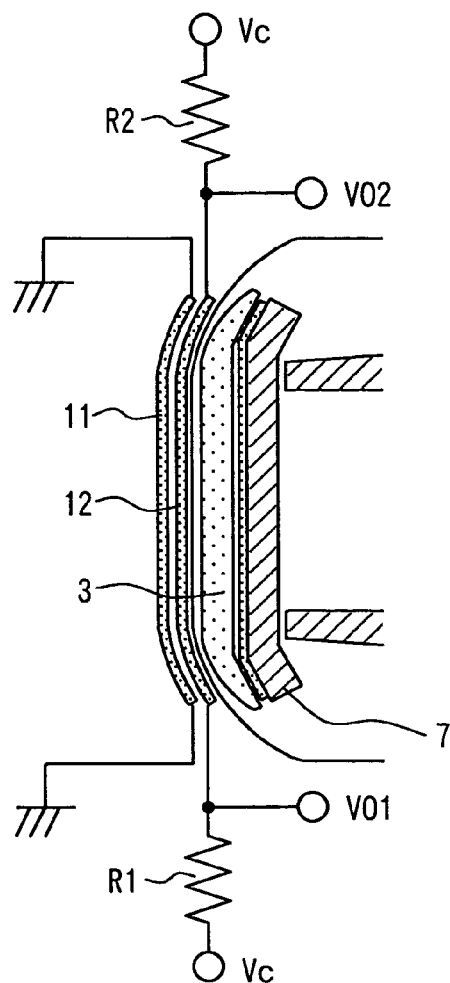
FIG. 3 is a schematic view showing a collision width detection sensor in the first embodiment.
Figure 4:
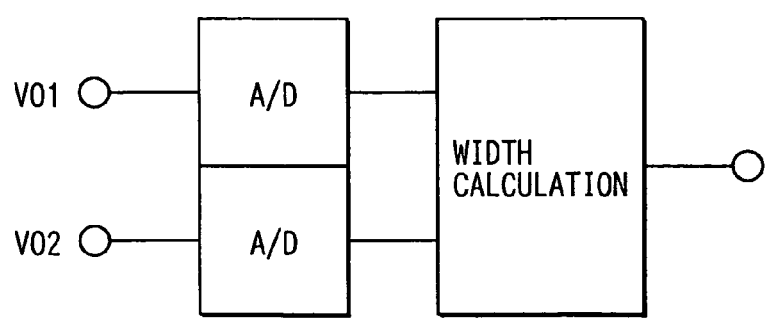
FIG. 4 is a circuit diagram showing a circuit part of the collision width detection sensor shown in FIG. 3.

The contact width detection sensor 1 detects a collision width, that is, a lateral width of a collision object hitting the contact width: detection sensor 1. The contact width detection sensor 1 is constructed as shown in FIGS. 3 and 4. The contact width detection sensor 1 includes a pair of conductive members 11 and 12 such as wires and strips spaced apart from each other by a predetermined spatial interval in the vehicle longitudinal direction (front-back direction) and extended in parallel to each other in the lateral direction. The conductive member 12 is fixed to the front surface of the bumper cover 8, and the conductive member 11 is disposed in front of the conductive member 12 spaced by the predetermined interval.

The interval between the conductive member 11 and the conductive member 12 is set by fixing the conductive member 11 to the conductive member 12 through elastic bodies of, for example, rubber of uniform thickness. The elastic bodies are disposed in the lateral direction at a predetermined pitch, and the conductive members 11 and 12 directly face each other between the pair of adjacent elastic bodies. Thus, when collision with the conductive member 11 occurs, the conductive member 11 is pressed backward to compress the elastic bodies, and comes in contact with the conductive member 12. When the collision state is removed, the compression of the elastic bodies is removed, the conductive member 11 is returned to the original position.

In order to prevent erroneous collision detection, a collision load not lower than a predetermined threshold level is required to compress the elastic bodies and to bring the conductive members 11 and 12 into contact with each other. In FIG. 3, the position of the conductive members 11 and 12 may be reversed.

In this embodiment, the conductive member 11 has a low resistance that can be neglected, and the conductive member 12 has a predetermined resistance. The conductive member 11 is grounded. Power supply voltages Vc are individually applied to both ends of the conductive member 12 through resistance elements R1 and R2. The power supply voltage Vc may be applied to the conductive member 11 and grounding may be performed at the conductive member 12 side.

By this, in the case where collision does not occur, voltages V01 and V02 at connection points between the conductive member 12 and the resistance elements R1 and R2 become the level of the power supply voltage Vc. By this, it is determined that collision does not occur.

Upon collision, for instance, an area between a predetermined point P1 of the conductive member 11 in the lateral direction and a predetermined point P2 (at the resistance element R2 side) comes in contact with the conductive member 12. When a resistance value of the conductive member 12 from the vehicle left side (lower end of the conductive member 12 in FIG. 3) to the point p1 is r1, the output voltage V01 becomes Vc(r1/(r1+R1)). When a resistance value of the conductive member 12 from the vehicle right side (upper end of the conductive member 12 in FIG. 3) to the point p2 is r2, the output voltage V02 becomes Vc(r2/(r2+R2)). It is preferable that R1 is equal to R2.

The output voltage V01 and the output voltage V02 are changed in accordance with the distances from both ends of the conductive member 12 to the end of the collision area. These distances W1 and W2 can be calculated from stored map data. The lateral width of the collision area can be calculated by subtracting these distances W1 and W2 from the whole lateral length Wo of the conductive member 12. In this embodiment, as shown in FIG. 4, the output voltage V01 and the output voltage V02 are converted into digital signals by A/D converters of a microcomputer in the control unit 4, and applied to a calculation section of the microcomputer for performing processing to calculate the collision width (contact width).

Figure 5:
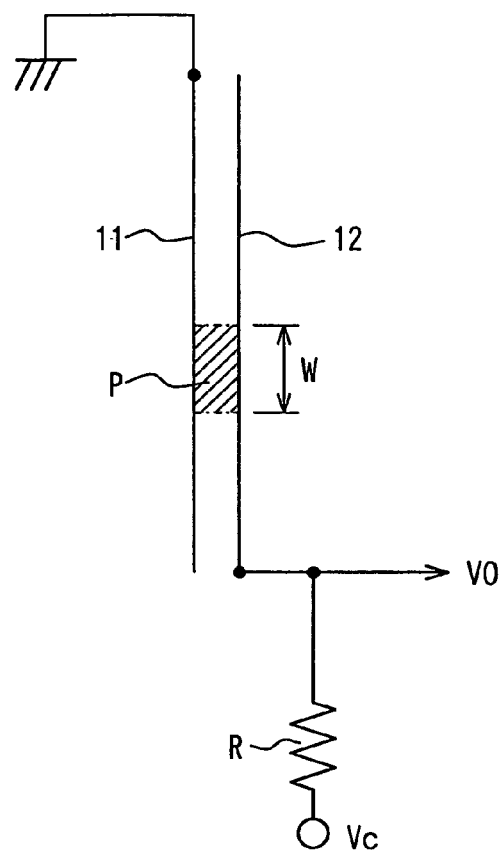
FIG. 5 is a schematic view showing a modification of the collision width detection sensor.

The contact width detection sensor 1 may be modified as shown in FIG. 5. In this modification, conductive members 11 and 12 are resistance members having resistance values equal to each other, one end of the conductive member 11 is grounded, and the power supply voltage Vc is applied to the other end of the conductive member 12 through a resistance element R. The electric resistance of each of the conductive members 11 and 12 in the lateral direction is r. An output voltage V0 at the time of non-collision is Vc.

When the conductive members 11 and 12 come in contact with each other at a very small area, the output voltage V0 becomes Vc(r/(r+R)). The whole width of each of the conductive members 11 and 12 is W0. As shown in FIG. 5, in the case where a contact area P has a collision width W, the output voltage becomes Vc(r1/(r1+R)). Here, r1 denotes the resistance of the conductive members 11 and 12 and becomes r((W0−W)/W). That is, as the contact width W becomes large, the output voltage V0 becomes low from Vc(r/(r+R)), and the collision width W may be calculated from the output voltage V0 based on the stored map data.

Figure 6:
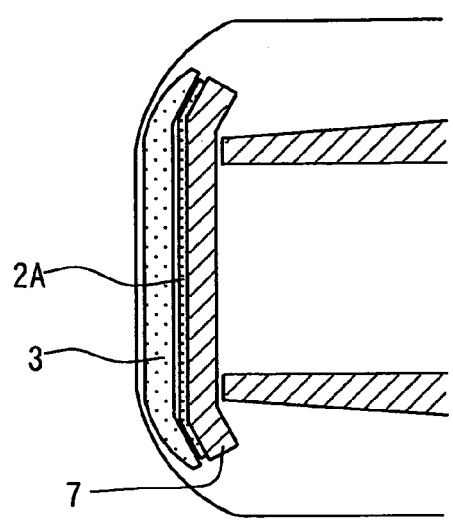
FIG. 6 is a schematic view showing a modification of the collision load detection sensor.

The collision load detection sensor 2 is a sensor for outputting an analog signal voltage corresponding to a collision load. FIG. 6 shows an example of the collision load detection sensor 2. The collision load detection sensor 2 is made of a thin film surface pressure sensor 2A. This sensor 2A is provided along the front surface of the bumper reinforcing member 7 and is extended in the lateral direction. This sensor 2A is made up of a pair of electrode wires as conductive members spaced from each other by a predetermined spatial interval and extended in the lateral direction, and a rubber film containing carbon and disposed between both electrode wires. When a collision load is applied to this rubber film, the rubber film is compressed in the front-back direction, and the electric resistance of the rubber film in the front-back direction (thickness direction) is lowered. Accordingly, the collision load can be detected by detecting the electric resistance between both electrode wires.

The collision load detection sensor 2A may be different in structure from that shown in FIG. 6. For example, a rubber tube including therein a pressure sensor may be disposed in the lateral direction. When collision occurs, the rubber tube is compressed and the inner pressure is increased in accordance with the collision load.

Figure 7:
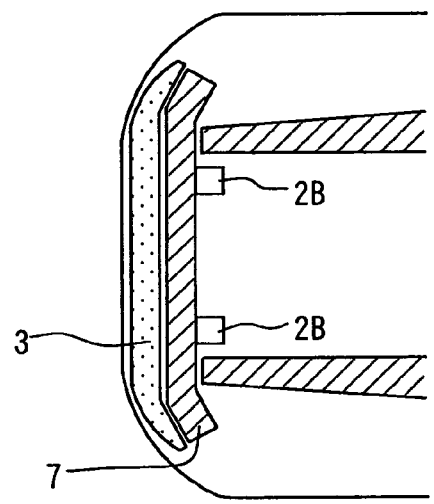
FIG. 7 is a schematic view showing a modification of the collision load detection sensor.
Figure 8:
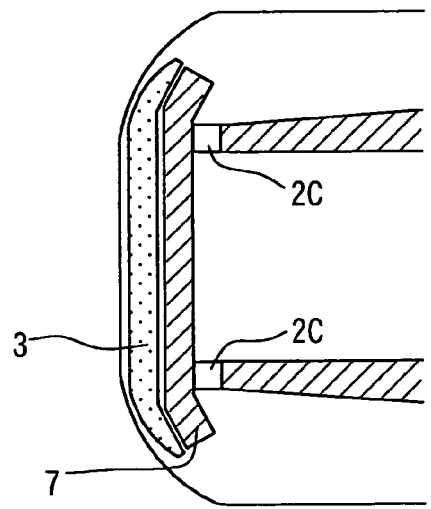
FIG. 8 is a schematic view showing a modification of the collision load detection sensor.

In addition, as shown in FIGS. 7 and 8, the collision load may be detected by an acceleration sensor 2B or a load sensor 2C. That is, it is possible to adopt acceleration sensors 2B installed between the bumper reinforcing member 7 and side members, load sensors 2C installed on the bumper reinforcing member 7 or the side members to detect acceleration at the time of collision.

Further, the load detection sensor 2 may be a thin film surface pressure sensor or a contact-type switch sensor installed on the reinforcing member surface, the bumper surface or the bumper cover surface to detect the surface pressure at the time of collision, or a displacement sensor installed on the bumper 3 or the bumper cover 8 and for detecting deformation of the bumper 3 at the time of collision.

Next, a pedestrian discrimination method using the above detected collision width and the detected collision load will be described with reference to a flowchart shown in FIG. 9. This determination processing is executed by the control unit 4 at an every predetermined interval.

First, a collision load F detected by the collision load sensor 2 is read (S11). In the case where it exceeds a threshold Fth0 (YES at S12), a built-in timer T1 is reset (S13). That is, a timer count T is reset to 0. The collision load F is again read (S14). The timer T1 is incremented (S15), until the collision load F becomes larger than a threshold Fth1 larger than Fth0 (YES at S16). Thus, the time (T1) required for the detected load F to increase from the threshold Fth0 to the threshold Fth1 is measured.

When the collision load F becomes the threshold Fth1, composite collision rigidity K of the collision object and the bumper 3 is calculated (S17) as a function of the measured time T1. This calculation may be attained by using a stored predetermined data defining a relation between T1 and K. The relation may be defined by experiments, and a conversion table is stored in a memory of the control unit 4. This composite collision rigidity K is a functional value having a negative correlation with time necessary for the collision load F to increase from a low value to a high value.

Specifically, if the composite collision rigidity K is large, it means that the collision portion between the collision object and the vehicle body is hard, and the collision load F increases in a short time. If the composite collision rigidity K is small, it means that the collision portion between the collision object and the vehicle body is not hard and the collision load F increases in a long time. That is, it can be determined that the composite collision rigidity K is a parameter indicating the resistance to deformation.

Next, the contact width W is read (S18) from the output of the contact width detection sensor 1 at the time point when the collision load F becomes larger than Fth1. Then, the collision rigidity Kb of the bumper 3 is calculated (S19) as a function of the detected collision width W. This relation may also be stored as a map data in the memory of the control unit 4.

As an alternative to S19, when it is assumed that the collision width W is constant, it may be considered that the collision rigidity Kb of the bumper 3 to a value of the collision load F, that is, the resistance of the bumper per unit width to the deformation is a constant value. Accordingly, the collision rigidity Kb of the whole bumper may be considered to be the collision width W×bumper collision rigidity value per unit width. That is, the collision rigidity Kb of the bumper 3 here is the deformation resistance of the bumper 3 changing in according with the contact width W.

Next, collision rigidity Kc of the collision object is calculated (S20) from the obtained composite collision rigidity K and the bumper collision rigidity Kb. Although a map data may be used, it can also be calculated by the following expression.

$$Kc=(Kb-K)/K \cdot Kb \qquad (1)$$

The collision object collision rigidity Kc can be considered to be one indicator which indicates the deformation resistance of the collision portion of the collision object at the time of collision. A pedestrian has a value within a certain range. In this embodiment, it is assumed that the collision object collision rigidity Kc is also changed according to the collision width W, the collision object collision rigidity per unit collision width is calculated, and this is used as the collision object collision rigidity Kc.

Next, it is determined (S20) whether or not the collision object collision rigidity Kc falls within a predetermined range (from Kth1 to Kthh). It is discriminated (S22) that the collision object is a pedestrian in the case where the rigidity Kc falls within the range. It is also discriminated (S23) that the collision object is a non-pedestrian in the case where the rigidity Kc falls outside the range.

In this embodiment, it is discriminated that the collision object is a pedestrian in the case where Kc falls within the range of 30 N/mm to 150 N/mm. The collision object is other than a pedestrian in the case where it falls outside the range. That is, in FIG. 9, Kth1 is set to 30, and Kthh is set to 150.

First Modification

A modification of a pedestrian discrimination will be described with reference to a flowchart shown in FIG. 10.

Figure 9:
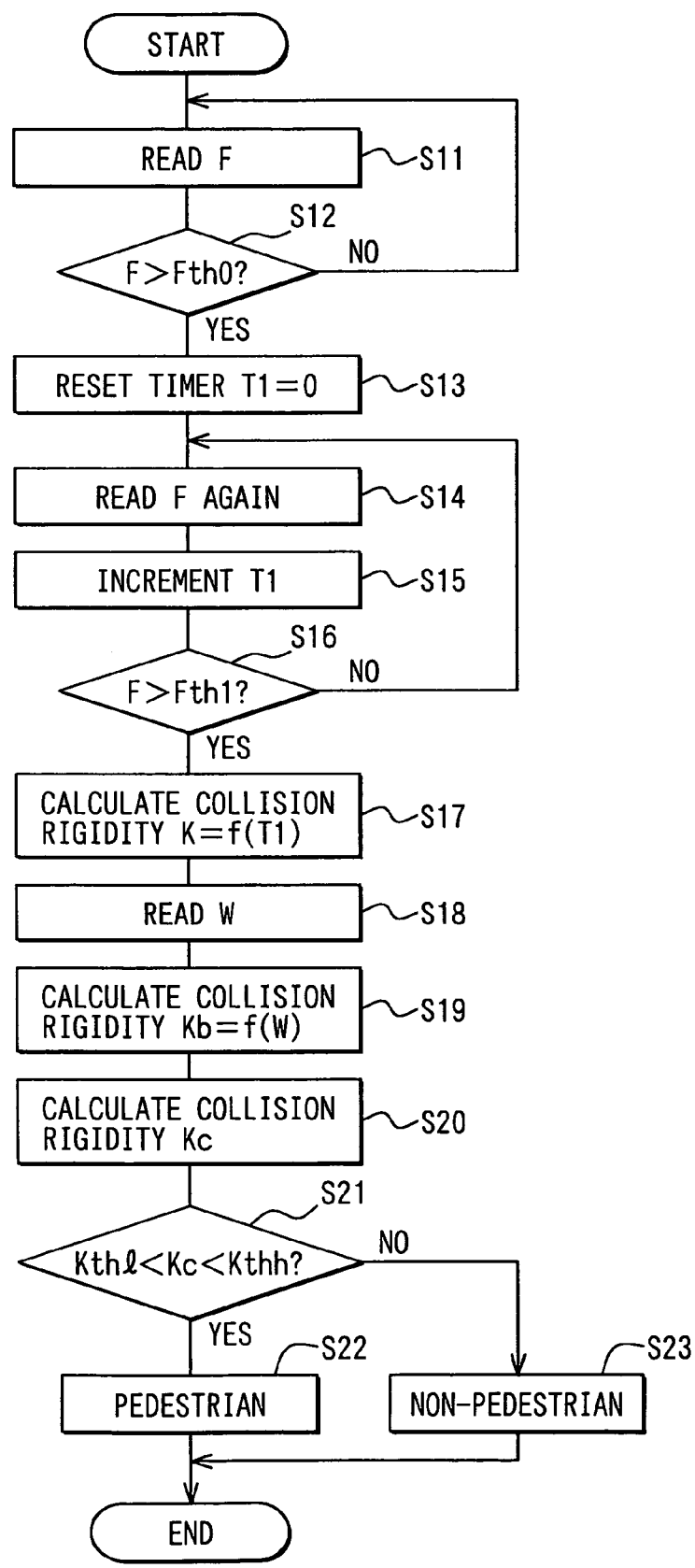
FIG. 9 is a flowchart showing pedestrian discrimination processing in the first embodiment.
Figure 10:
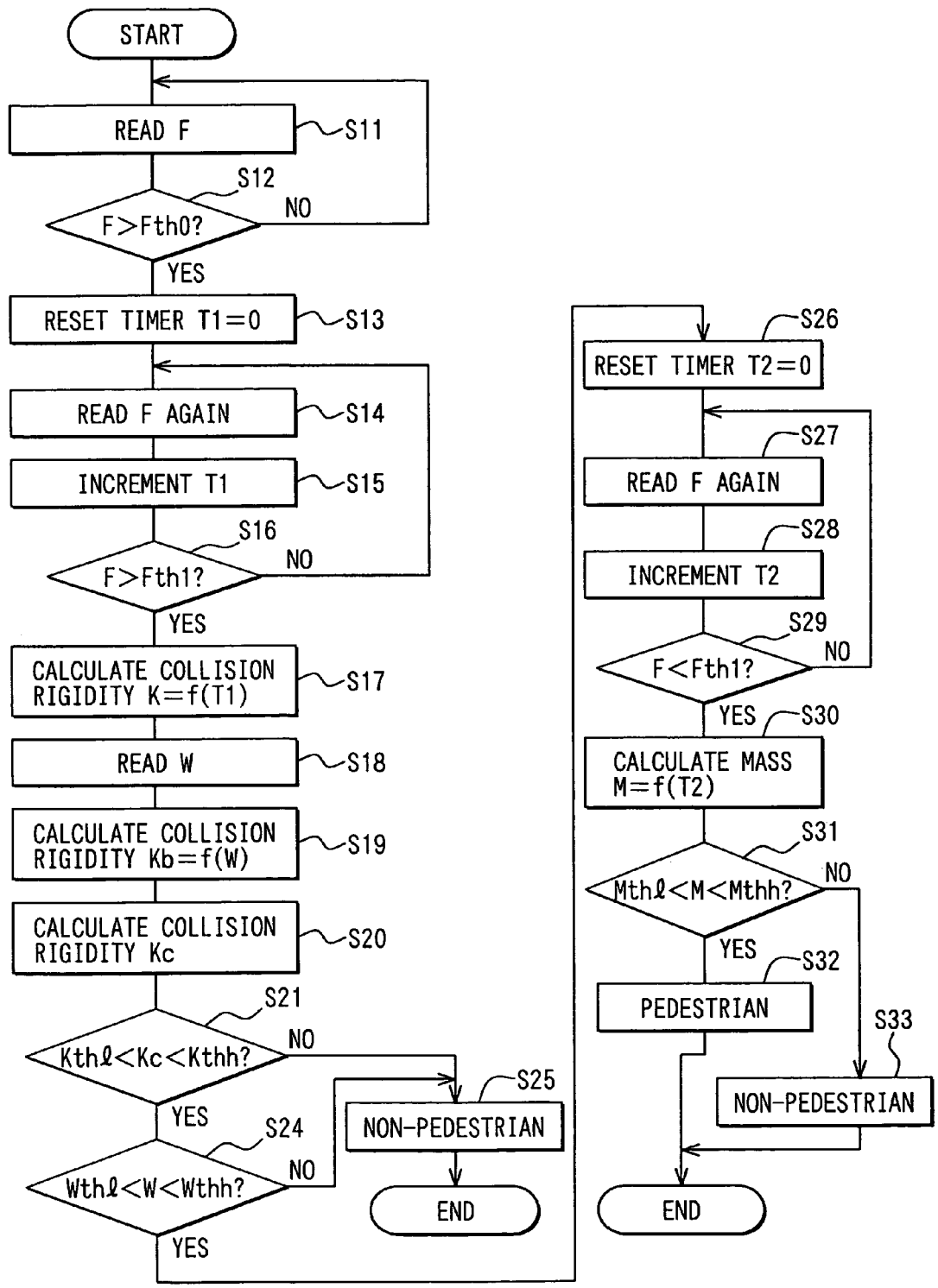
FIG. 10 is a flowchart showing a first modification of a pedestrian discrimination processing in the first embodiment.

In FIG. 10, the processing till step S21 is the same as that of FIG. 9. In this modification, even in the case where the collision object collision rigidity Kc is within the range where the collision object can be regarded as a pedestrian, it is not immediately determined to be a pedestrian. An additional pedestrian discrimination routine is further carried out to improve a pedestrian discrimination accuracy.

First, it is determined (S24) whether or not the collision width W falls within a predetermined range of Wth1 to Wthh as a possible range of a pedestrian lateral width. If the collision width does not fall in the predetermined range, the collision object is determined to be other than a pedestrian (S25). If it falls in the predetermined range, a built-in timer T2 is reset (S26) and the collision load F is again read (S27). The timer T2 is incremented (S28), so that the time T2 elapsing until the collision load F becomes smaller than the threshold Fth1 (larger than Fth0) again is measured.

When the collision load F becomes the threshold Fth1 larger than Fth0 (YES at S29), the collision object mass M is calculated (S30) as a function of the measured time T2. This mass. M may be determined by using a stored map data defining a relation between T2 and collision object mass M. The relation may be defined experimentally, and a conversion table is stored in the control unit 4.

Specifically, after the collision object is intensely pressed to the vehicle body, it is bumped off by elasticity of the collision object and the bumper 3, and the collision load F is lowered. The time period in which the collision object is kept intensely pressed to the vehicle body is short when the mass of the collision object is small. It is however long when the mass of the collision object is large. Accordingly, the mass M of the collision object can be calculated from the time of the timer T2.

Next, it is determined (S31) whether or not the calculated mass M of the collision object falls within a predetermined range of Mth1 to Mthh as the possible range of the mass of a pedestrian. If it falls within the range, the collision object is determined (S32) to be a pedestrian. If it does not fall within the range, the collision object is determined (S33) to be a non-pedestrian and the routine is ended.

That is, in this modification, only in the case where the three values, that is, the mass M of the collision object, the contact width W detected by the contact width detection sensor 1, and the collision rigidity Kc of the collision object fall within the predetermined ranges, the collision object is determined to be a pedestrian. In the case where any one of the three values falls outside the predetermined range, it is determined to be one other than a pedestrian. Thus, the discrimination accuracy can be remarkably raised.

Second Modification

Figure 11:
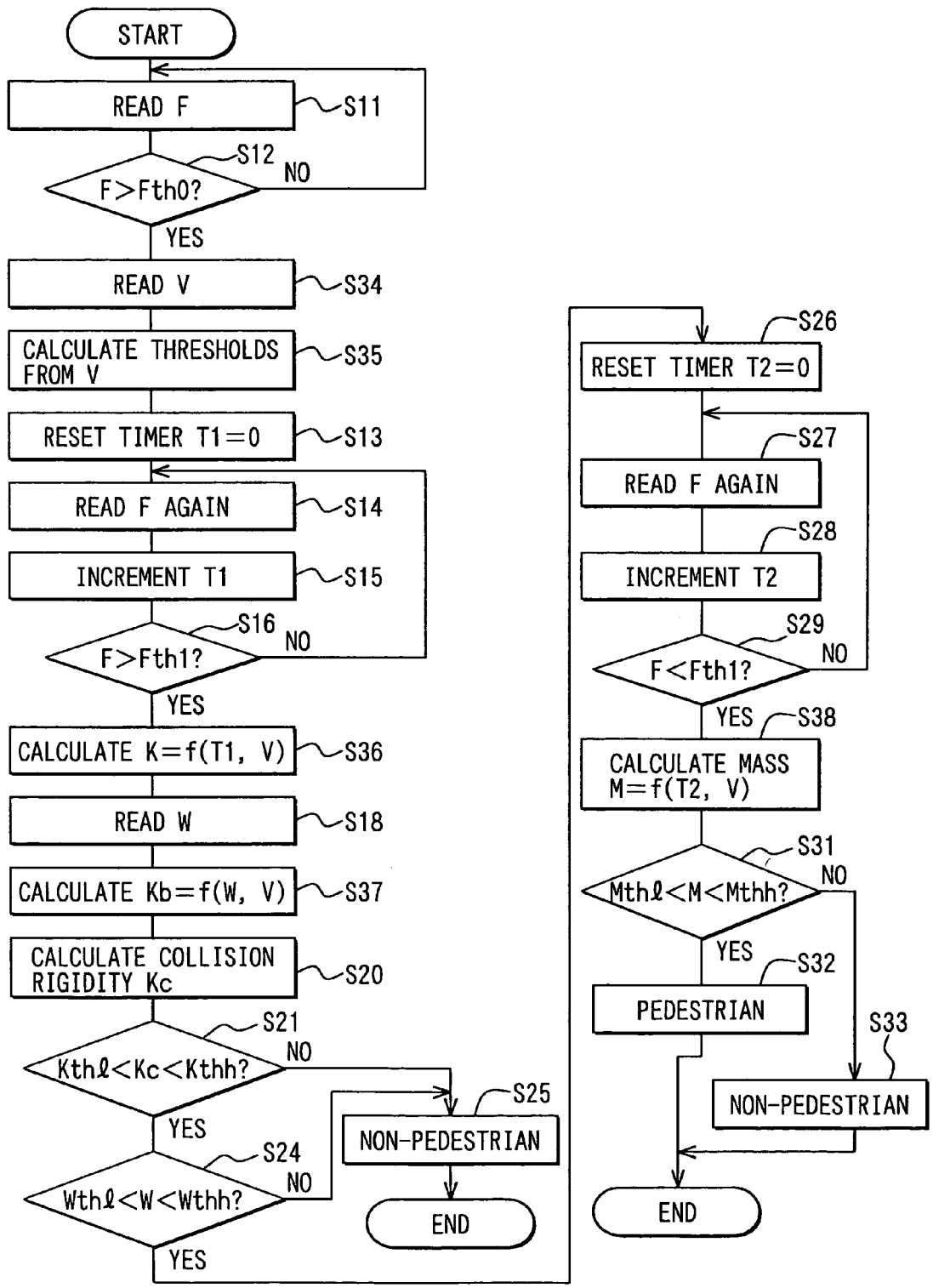
FIG. 11 is a flowchart showing a second modification of a pedestrian discrimination processing in the first embodiment.

A further modification of pedestrian discrimination will be described with reference to a flowchart shown in FIG. 11. In this discrimination process, the change of the collision load due to the vehicle speed V is corrected.

Specifically, after S12, the vehicle speed V is read (S34) from the vehicle speed sensor 5. In order to correct the change of the collision load F changing in accordance with the vehicle speed V, the respective thresholds of FIGS. 9 and 10 are calculated or corrected (S35) by using a stored relation between the vehicle speed V and respective thresholds.

Besides, when composite collision rigidity K, bumper collision rigidity Kb, and collision object mass M are calculated (S36, S37, S38) on the further basis of the vehicle speed V. For this purpose, each map data may be provided for different vehicle speeds. By doing so, the influence of the vehicle speed on the collision load can be compensated.

Third Modification

Figure 12:
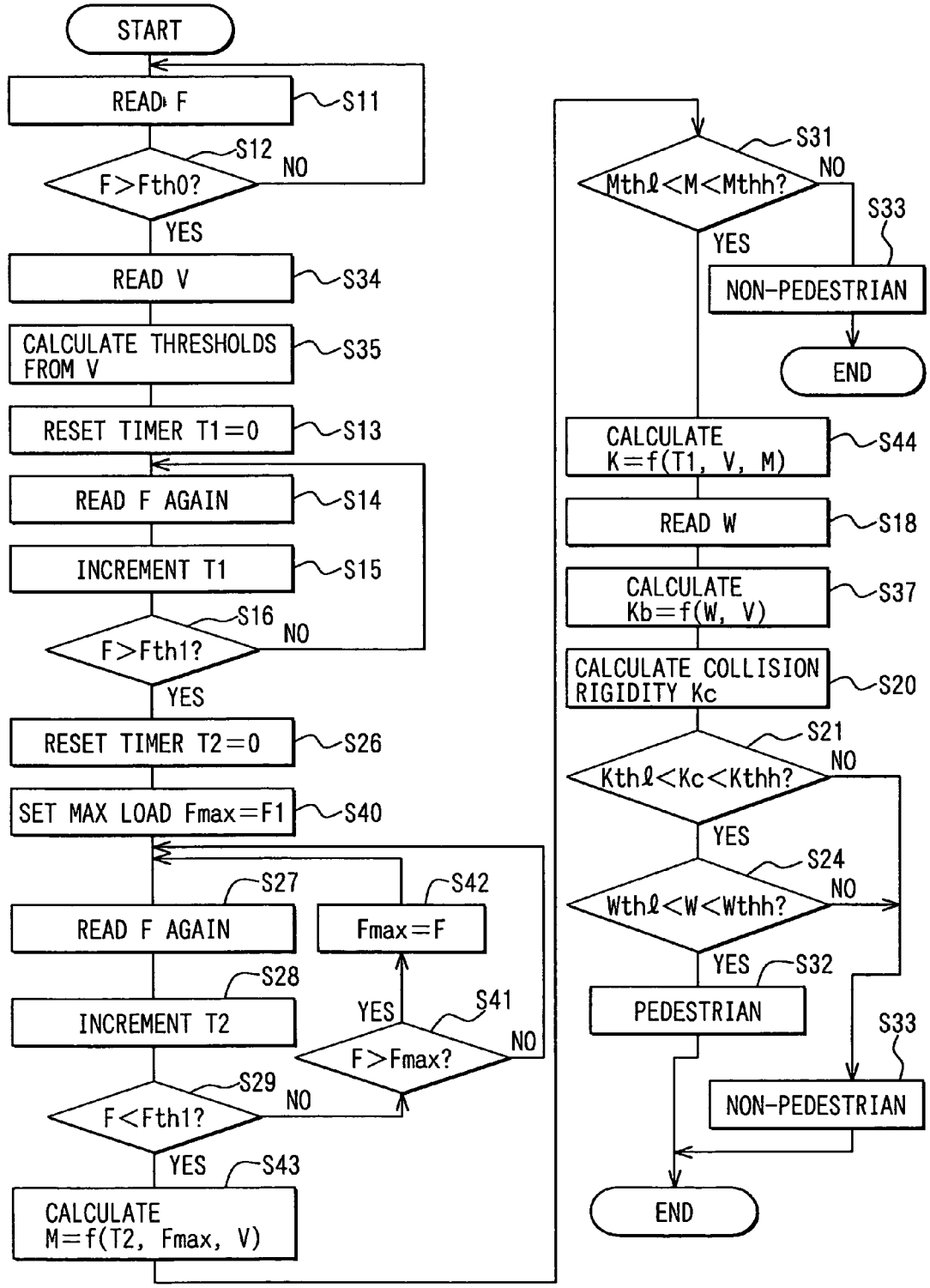
FIG. 12 is a flowchart showing a third modification of a pedestrian discrimination processing in the first embodiment.

A third modification will be described with reference to a flowchart shown in FIG. 12. In this modification, the order of the calculation steps of the rigidity K, Kb, Kc and the calculation step of the mass M in the second modification shown in FIG. 11 is reversed.

First, a maximum load Fmax is set (S40) to an initial value F1 after the time T2 is reset (S26). The load F is then corrected (S41, S42) when the load F is not smaller than Fth1 (NO at S29). If the load F is smaller than Fth1 (YES at S29), the collision object mass M is calculated (S43) based on the maximum collision load Fmax in addition to the time T2 and the vehicle speed V. Next, the composite collision rigidity K is calculated as a function of the collision object mass M, the time T1 and the vehicle speed.

Here, when the composite collision rigidity K and the collision object mass Mare determined (S43, S44) by using stored map data, the map data may be provided for respective vehicle speeds. Thus, the mass of the collision object and the collision rigidity can be obtained with high accuracy.

Fourth Modification

In the routines shown in FIGS. 9 and 10, it is merely determined whether or not the collision load F is larger than the threshold Fth1. Accordingly, in the case of FIGS. 9 and 10, the collision load detection sensor 2 can be made a binary sensor, not the analog sensor.

Second Embodiment

Figure 2:
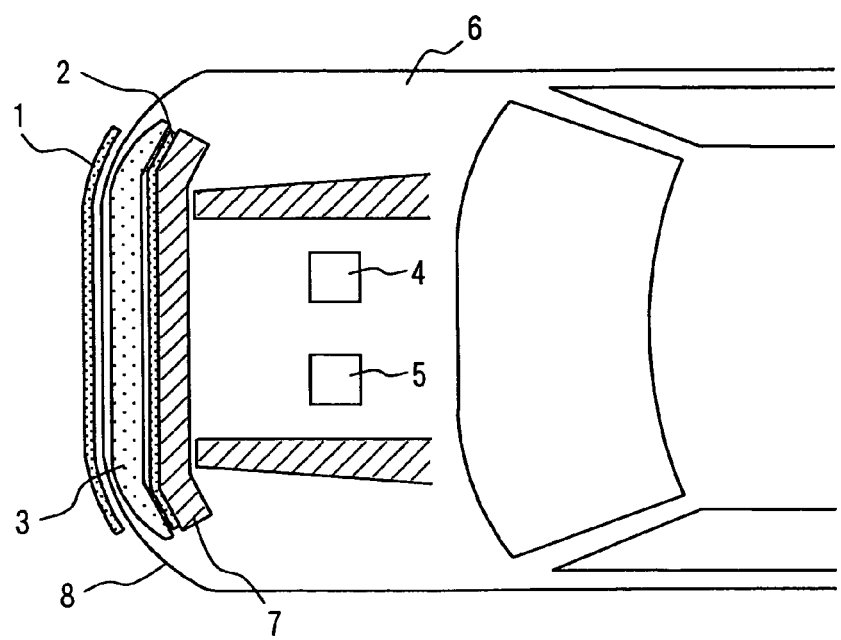
FIG. 2 is a schematic view showing an arrangement of the collision object discrimination apparatus in a vehicle in the first embodiment.
Figure 13:
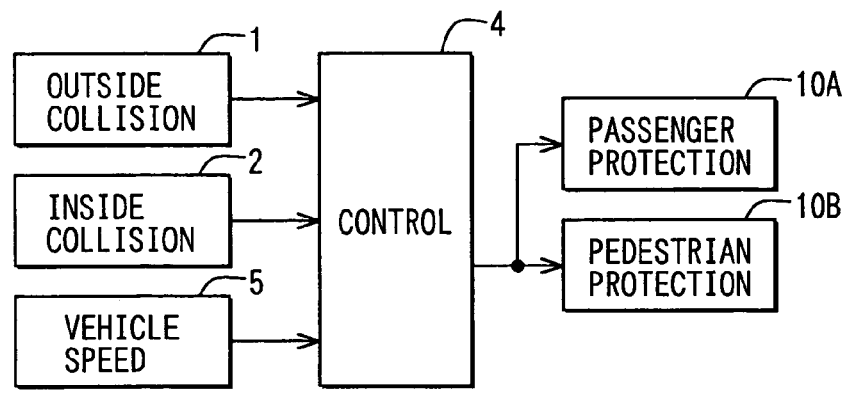
FIG. 13 is a block diagram showing a collision object discrimination apparatus for vehicles according to a second embodiment of the present invention.
Figure 14:
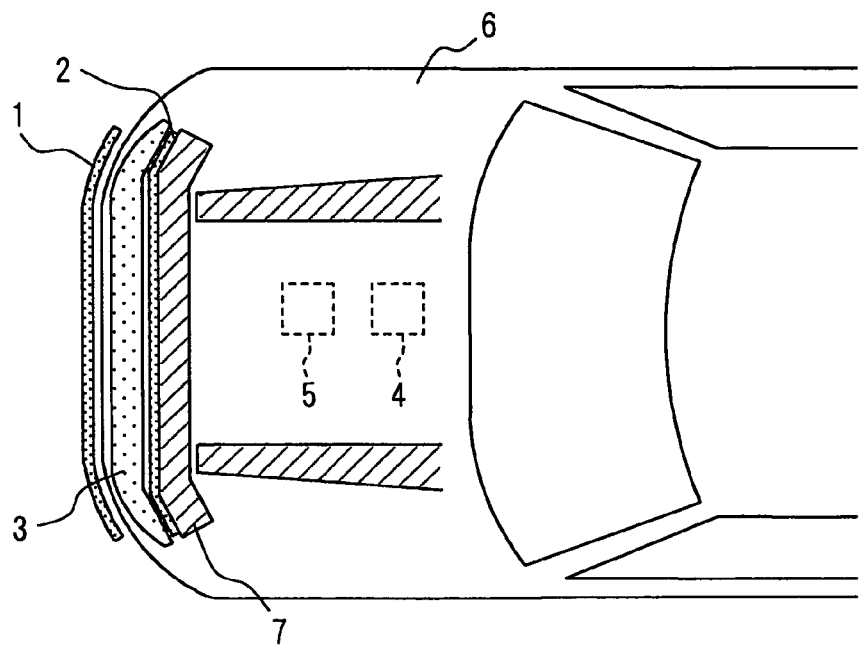
FIG. 14 is a schematic view showing an arrangement of the collision object discrimination apparatus in a vehicle in the second embodiment.

A collision object discrimination apparatus for vehicles according to a second embodiment will be described with reference to block diagrams shown in FIGS. 13 and 14. In this embodiment, the contact width detection sensor 1 provided at the front side of the bumper 3 as shown in FIGS. 1 and 2 is used as a front side collision detection sensor. The collision load detection sensor 2 provided at the rear side of the bumper 3 as shown in FIGS. 1 and 2 is used as a rear side collision detection sensor 2.

Figure 15:
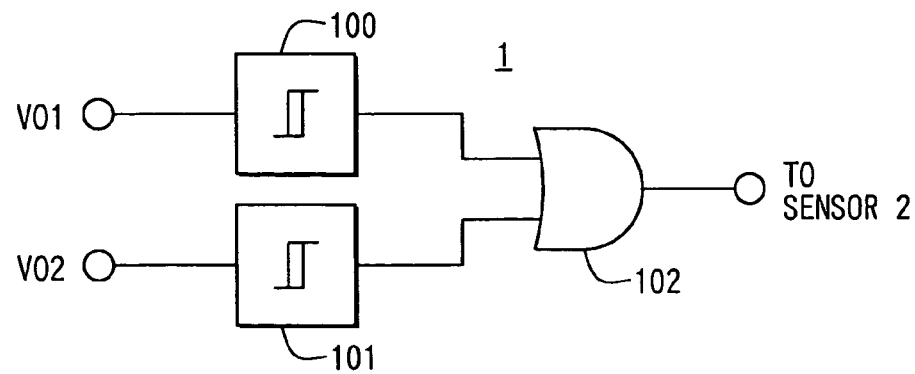
FIG. 15 is a circuit diagram showing a circuit part of a collision load detection sensor in the second embodiment.

Although the front side collision detection sensor 1 has the same structure as the contact width detection sensor 1 shown in FIGS. 1 and 2, it detects a contact width, and outputs a binary signal, which becomes an ON level when a collision load exceeds a predetermined threshold level, to a circuit part of the rear side collision detection sensor 2. The front side collision detection sensor 1 is constructed as shown in FIG. 3. However, as shown in FIG. 15, the output voltage V01 and the output voltage V02 are respectively converted into binary signals by Schmitt trigger circuits 100 and 101. These binary signals are inputted to an OR circuit 102, and a logical sum signal of those is outputted to the circuit part of the rear side collision detection sensor 2.

Specifically, in the contact width detection sensor 1 of FIG. 3, when collision occurs, the output voltage V01 and the output voltage V02 are changed stepwise from a non-collision load to a certain level. If the thresholds of Schmitt trigger circuits 100 and 102 are set to intermediate values of this change width between the two levels, the existence of collision can be detected from the output voltage V01 and the output voltage V02 of the contact width detection sensor 1 of FIG. 3.

The rear side collision detection sensor 2 is different from the collision load detection sensor 2 of FIGS. 1 and 2 in that it is a binary sensor for outputting an ON level when the collision load exceeds a predetermined threshold and outputs an OFF level when the collision load does not exceed it. The rear side collision detection sensor 2 can be constructed such that for example, in the contact width detection sensor 1 shown in FIG. 5, the pair of conductive members 11 and 12 is made of electrode wires of low resistance.

Upon collision, when the collision load becomes larger than a predetermined threshold regulated by the elastic coefficient of the intermediate elastic body, the conductive members 11 and 12 come in contact with each other at the collision portion. The output voltage V0 is changed to the ON level by that. When the collision load becomes lower than the predetermined threshold regulated by the elastic coefficient of the elastic body, the conductive members 11 and 12 are separated from each other by the elasticity of the intermediate elastic material. The output voltage V0 thus becomes the power supply voltage Vc, that is, the OFF level. The ON level and the OFF level of the output voltage V0 are converted into binary levels in a predetermined voltage range.

As the bumper 3, in addition to one which performs impact force dispersion and impact force absorption by plastic deformation, such as polyurethane, one having the same operation by elastic deformation may be used. The bumper 3 has functions to transmit the collision impact force generated by the collision with the collision object to rear parts while dispersing and attenuating it, and to reduce the collision impact force acting on the rear side collision detection sensor 2. Although a part of the rear surface of the bumper 3 comes in close contact with the front surface of the rear side collision detection sensor 2, the remaining part (for example, portion extending above and below the rear side collision detection sensor 2) of the rear surface of the bumper 3 may come in close contact with the front surface of the bumper reinforcing member 7.

The control unit 4 incorporates a microcomputer, which carries out a predetermined operation based on predetermined input signals including at least the output signals of the front side collision detection sensor 1 and the rear side collision detection sensor 2, and discriminates a source of collision impact force, that is, whether or not the collision object is a pedestrian. When the magnitude of the collision impact force is large, a passenger protection apparatus (for example, an airbag for protecting a passenger, etc.) 10A may be activated. When the collision object is a pedestrian, a pedestrian protection apparatus (for example, a pedestrian protecting airbag, a flip-up hood apparatus, etc.) 10B may be activated.

FIGS. 16 to 19 show changes of loads (impact forces) acting on the front side collision detection sensor 1 and the rear side collision detection sensor 2 at the time of collision with a pedestrian, a light object (light fallen object) and a light fixture, which are obtained through experiments. It is assumed that the front side collision detection sensor 1 and the rear side collision detection sensor 2 output binary level output signals according to thresholds (ON level) in accordance with the magnitude of the input load.

Figure 16:
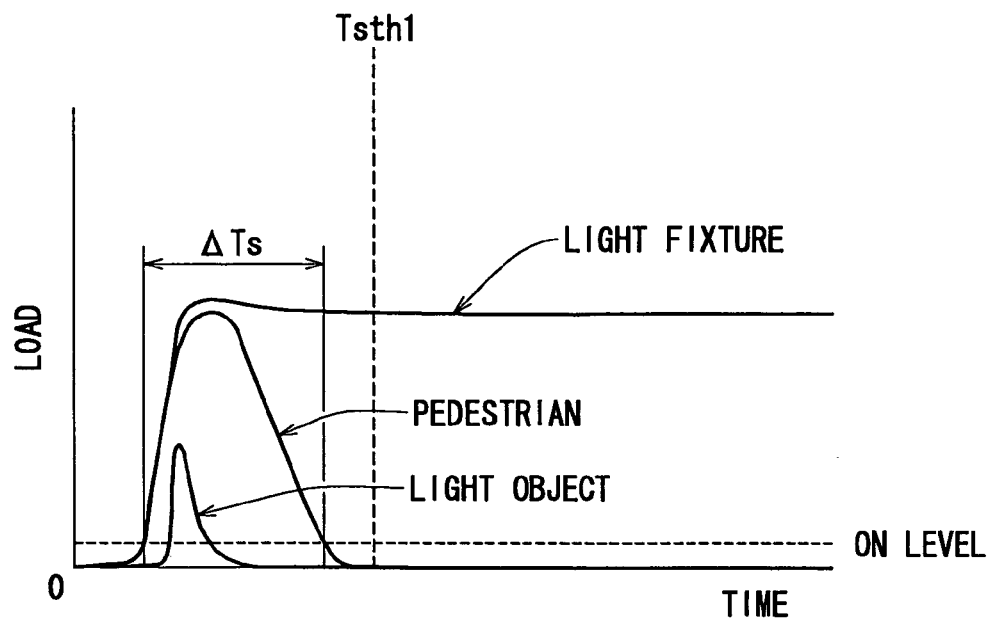
FIG. 16 is a characteristic diagram of a collision impact force inputted to a front side collision detection sensor in the second embodiment.
Figure 17:
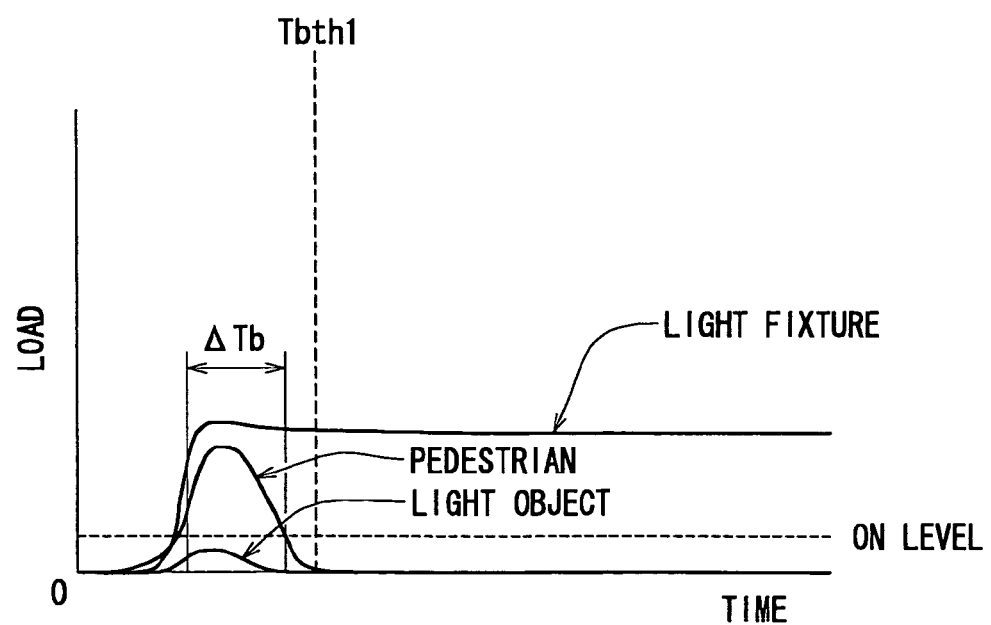
FIG. 17 is a characteristic diagram of a collision impact force inputted to a rear side collision detection sensor in the second embodiment.
Figure 18:
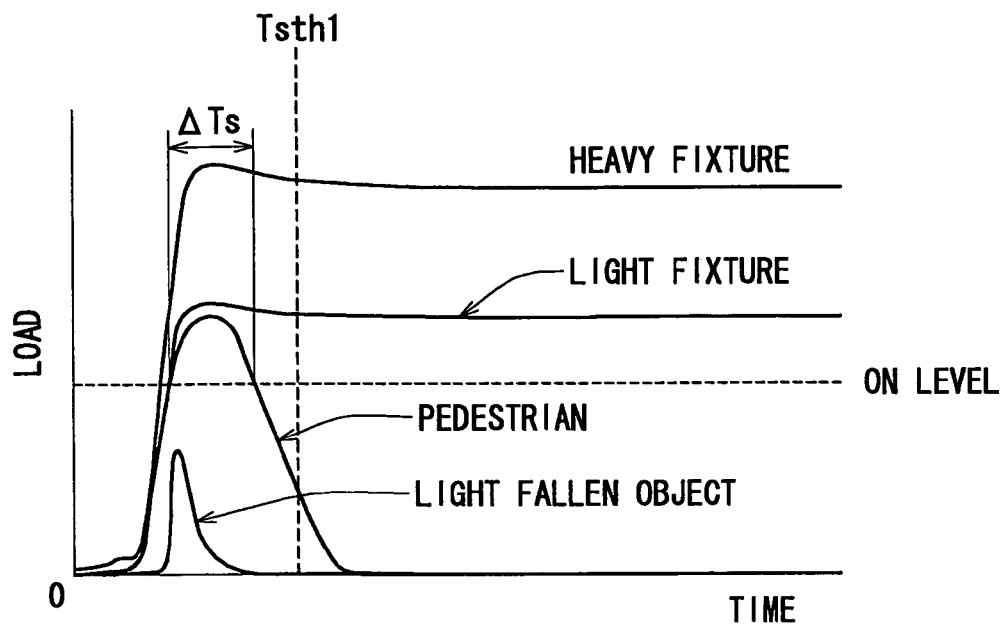
FIG. 18 is a characteristic diagram of a collision impact force inputted to the front side collision detection sensor.
Figure 19:
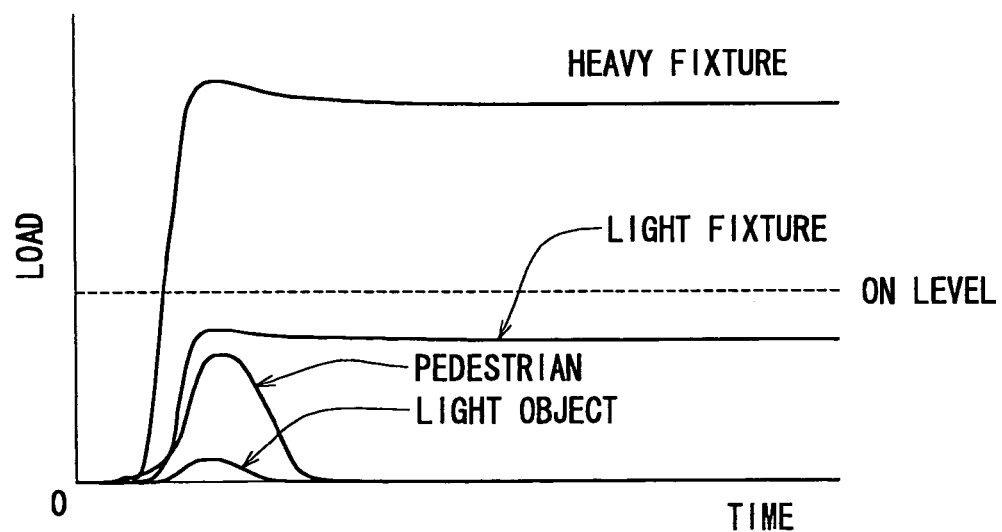
FIG. 19 is a characteristic diagram of a collision impact force inputted to the rear side collision detection sensor.

FIGS. 16 and 18 show output waveforms of the front side collision detection sensor 1 indicative of changes of applied load. FIG. 16 shows the collision waveforms with respect to a pedestrian, a light object and a light fixture, and FIG. 18 further shows the collision waveform with respect to a heavy fixture in addition to the waveforms shown in FIG. 16. FIGS. 17 and 19 show the output waveforms of the rear side collision detection sensor 2. FIG. 17 shows the collision waveforms with respect to a pedestrian, a light object and a light fixture, and FIG. 19 further shows the collision waveform with respect to a heavy fixture in addition to the former waveforms shown in FIG. 17.

FIGS. 16 and 18 are different from each other in the ON level of the front side collision detection sensor 1. In FIG. 16, the ON level is set to be low (light) so that the sensor signal is turned on even for a light object. In FIG. 18, the ON level is set higher so that the sensor signal is not turned on only for a light object. Similarly, FIGS. 17 and 19 are different from each other in the ON level of the inside collision sensor 2. In FIG. 17, the ON level is set so that the sensor is not turned on only for a light object. In FIG. 19, the ON level is set so that the sensor is turned on only for a heavy fixture.

Here, the front side collision sensor 1 or the rear side collision detection sensor 2 can also output an analog output corresponding to the input load. In this case, this analog output is digitized by a comparator or the like. Of course, the sensors 1 and 2 may be binary output type sensors having thresholds corresponding to these ON levels.

A light object includes, for example, a movable object such as a sign board. The light fixture includes one having relatively low mass among objects fixed onto the ground, for example, a road sign. A heavy fixture includes, for example, a concrete wall. In these figures, a pedestrian ON duration time (ON duration time) $\Delta Ts$ (FIGS. 16 and 18), $\Delta Tb$ (FIG. 17) is a time when the sensor 1 or 2 is turned on at the time of collision with a pedestrian.

An ON duration time threshold Tsth1 (FIGS. 16 and 18), Tbth1 (FIG. 17) is a predetermined threshold time set to be longer by a predetermined time than the time point when the ON duration time is presumed to end. It is assumed that the front side collision detection sensor 1 shown in FIGS. 16 and 18 and the rear side collision detection sensor 2 shown in FIGS. 17 and 19 have the same output characteristic.

As shown in FIGS. 16 and 17, the load inputted to the rear side collision detection sensor 2 and acting on a light object, a pedestrian and the light fixture become much smaller than the load inputted to the front side collision detection sensor 1 due to attenuation and delay by the bumper 3. Especially, as is understood from the collision waveform of a light object, the bumper 3 has a characteristic to greatly attenuate a high frequency component of the load.

However, as is understood from FIGS. 18 and 19, with respect to a heavy fixture such as a concrete block wall, the bumper has hardly any impact attenuation and delay effect. Thus, the front side collision detection sensor 1 and the rear side collision detection sensor 2 generate the outputs of almost the same waveform.

By the setting of the ON level of FIGS. 16 and 17, it is understood that a light object (light fallen object) can be discriminated from other objects by the combination of the output levels of both sensors 1 and 2. That is, after the front side collision detection sensor 1 is turned on, if the rear side collision detection sensor 2 is not turned on in a predetermined time including a transmission delay in the bumper, the collision object may be determined to be a light object.

However, in FIGS. 16 and 17, alight fixture and a pedestrian cannot be discriminated from each other. The same applies to the case where the ON level is set as shown in FIGS. 18 and 19. That is, this is because the output peak values of both sensors 1 and 2 at the time of pedestrian collision are almost on the same level. However, as is understood from the comparison in FIGS. 16 and 17, a pedestrian and a light fixture are greatly different from each other in the ON duration time, and the ON duration time of a pedestrian is remarkably short.

Accordingly, it is determined whether or not the ON duration time of one of or both of the sensors 1 and 2 is not larger than a predetermined ON duration time threshold. If not larger, the collision object is determined to be a pedestrian. Thus a pedestrian can be discriminated from a light fixture and a heavy fixture. In the following, the light fixture and a heavy fixture are merely generically called a fixture.

It is understood that a pedestrian and a light object can be discriminated by the combination of the output levels of both sensors 1 and 2, and a pedestrian and a fixture can be discriminated by the ON duration time of one of or both of the sensors 1 and 2. That is, it becomes possible to accurately discriminate a pedestrian from various collision objects by the combination of the output levels of both sensors 1 and 2 and the ON duration time. A pedestrian discrimination operation carried out by the control unit 4 is shown as flowcharts in FIGS. 20 and 21. The discrimination condition is shown in the following table.

TABLE 1

|  | Combination of ON/OFF | | ON duration time ΔT | |
| --- | --- | --- | --- | --- |
|  | Front | Rear | Front | Rear |
| Light fallen object | ON | OFF | — | — |
| Pedestrian |  | ON | $\Delta Ts > Tsth1$ | $\Delta Tb < Tbth1$ |
| Light fixture Heavy fixture |  |  | $Tsth1 \leq \Delta Ts$ | $Tbth1 \leq \Delta Tb$ |

ΔTb: Rear side sensor duration time
Tbth: Rear side sensor duration time discrimination threshold In Table 1, $\Delta Ts$ denotes ON duration time of the front side collision detection sensor 1; $Tsth1$, ON duration time threshold of the front side collision detection sensor 1; $\Delta Tb$, ON duration time of the rear side collision detection sensor 2; and $Tbth1$, ON duration-time threshold of the rear side collision detection sensor 2.

Figure 20:
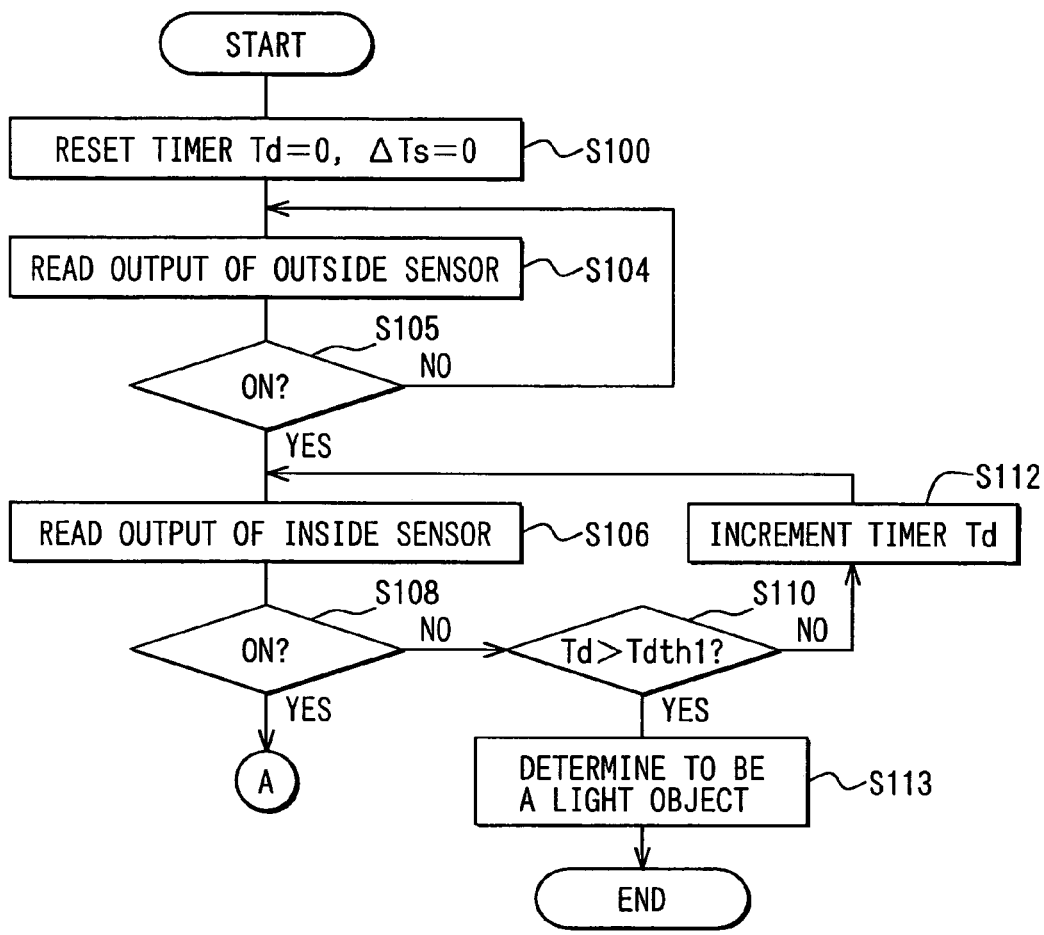
FIG. 20 is a flowchart showing a part of collision object discrimination processing in the second embodiment.
Figure 21:
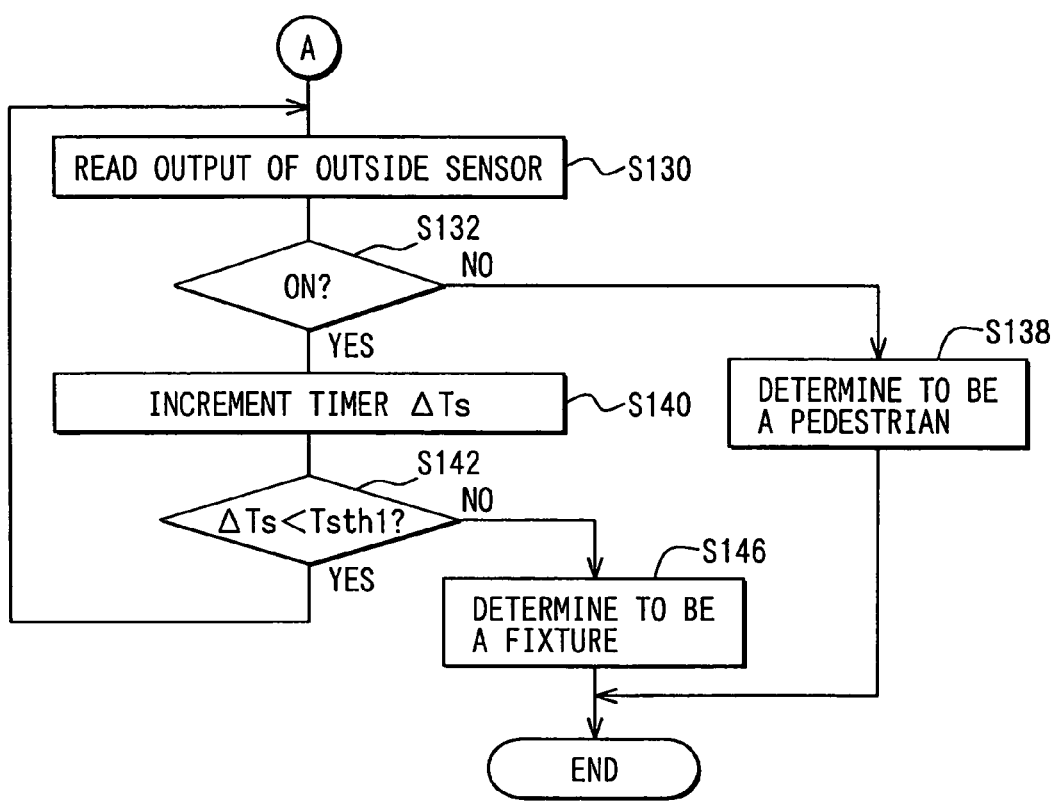
FIG. 21 is a flowchart showing the other par of the collision object discrimination processing in the second embodiment.

The flowcharts shown in FIGS. 20 and 21 will be described specifically. In FIGS. 20 and 21, $Td$ denotes ON time difference from the time point when the front side collision detection sensor (front sensor) 1 is turned on to the time point when the rear side collision detection sensor (rear sensor) 2 is turned on; $\Delta Ts$, ON duration time of the front side collision detection sensor 1; $Td$, time (ON time difference) from the time point when the front side collision detection sensor 1 is turned on to the time point when the rear side collision detection sensor 2 is turned on (ON time difference); $Tsth1$, pedestrian ON duration time threshold; and $Tdth1$, threshold time (ON time difference threshold) till a discrimination that the rear side collision detection sensor 2 is not turned on is made (ON time difference threshold).

When the processing starts, the ON duration time $Td$ count timer and the ON time difference $Td$ count timer are reset (S100). Then, the output level is read from the front side collision detection sensor 1 (S104), and waiting is performed until the output level exceeds the ON level (S105). When the output exceeds the ON level, the output level is read from the rear side collision detection sensor 2 (S106).

It is checked whether or not the output level exceeds the ON level (S108). If the output level does not exceed, it is checked whether or not the ON time difference $Td$ exceeds the ON time difference threshold $Tdth1$ (S110). If the ON time difference does not exceed, the value of the ON time difference timer $Td$ is incremented (S112), and the processing is returned to S106. If it exceeds, the collision object is determined to be a light object (S113), and the routine is ended.

Besides, at S108, when the output level of the rear side collision detection sensor 2 exceeds the ON level, the processing proceeds to S130.

The output of the front side collision detection sensor 1 is again read (S130). It is determined whether or not the rear side collision detection sensor 2 is ON (S132). When the rear side collision detection sensor 2 is OFF, the collision object is determined to be a pedestrian (S138), and the routine is ended.

When the front side collision detection sensor 1 is ON, the value $\Delta Ts$ of the ON duration time timer of the front side sensor is incremented. It is determined whether or not $\Delta Ts$ is less than the ON time difference threshold $Tsth1$ (S142). If it does not exceed, the processing returns to S130. If it exceeds, the collision object is determined to be a fixture (S146), and the routine is ended.

First Modification

Figure 22:
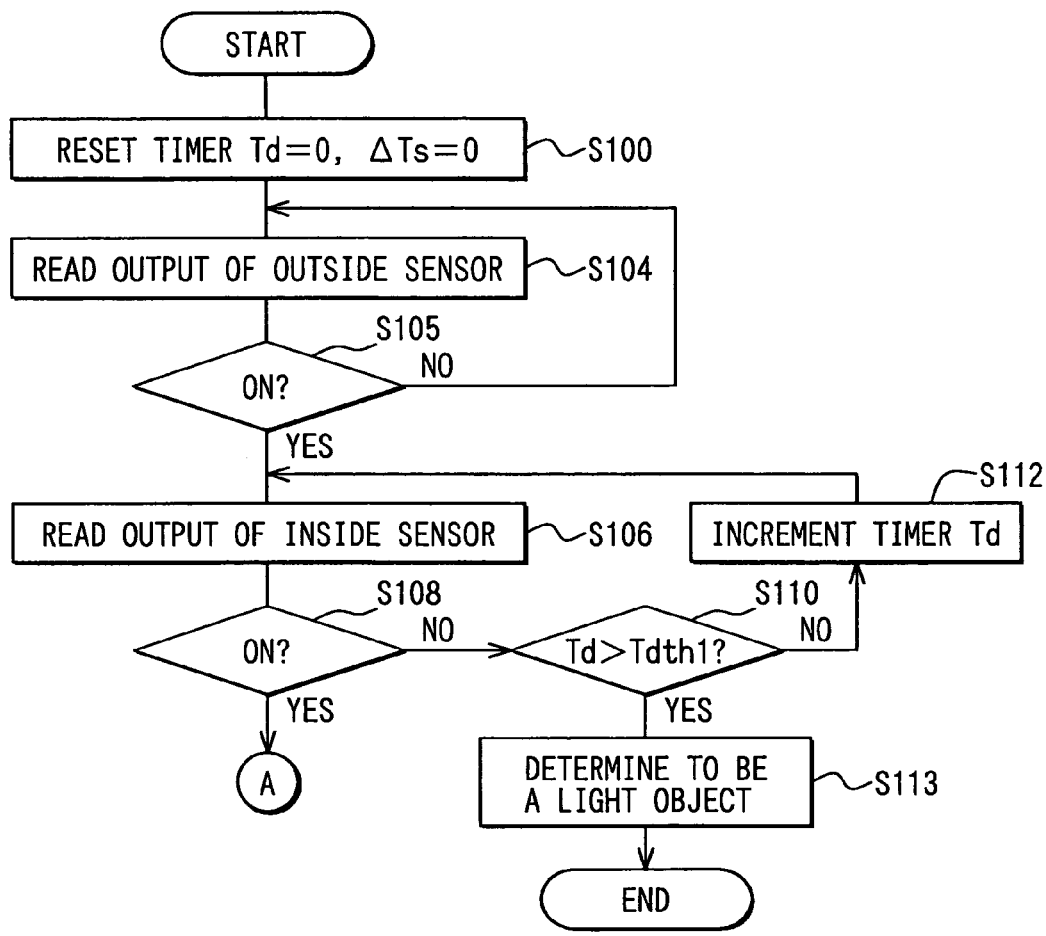
FIG. 22 is a flowchart showing a part of a first modification of collision object discrimination processing in the second embodiment.
Figure 23:
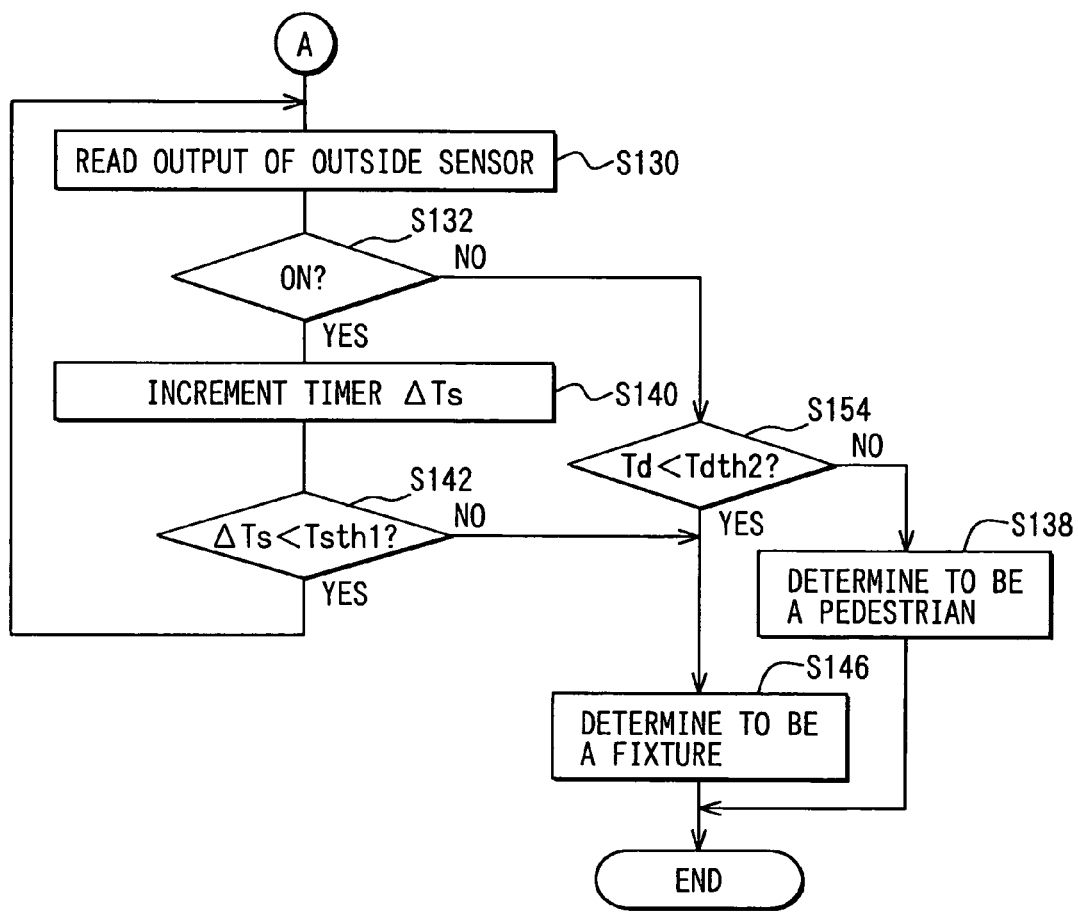
FIG. 23 is a flowchart showing the other part of the first modification of collision object discrimination processing in the second embodiment.

This modification is shown in FIGS. 22 and 23. In this modification, S154 is added to the processing shown in FIGS. 20 and 21.

Specifically, at S154, it is determined whether or not the ON time difference $Td$ as the time from the time point when the front side collision detection sensor 1 is turned on to the time point when the rear side collision detection sensor 2 is turned on is less than the ON time difference threshold $Tdth2$ as the threshold for discrimination of the length of the ON time difference $Td$. If $Td$ is less than $Tdth2$, the collision object is determined to be a fixture (S146). If not, it is determined to be a pedestrian (S138).

Second Modification

As is understood from FIGS. 18 and 19, in the case where the ON level is set to be high, a pedestrian can be determined with high accuracy by a discrimination method different from the discrimination method of FIGS. 20 and 21. That is, a pedestrian and a light object (light fallen object) can be discriminated by the output levels of both sensors 1 and 2. When the front side collision sensor 1 is turned on, the collision object is not a light object.

Further, with respect to a pedestrian and other fixtures (light fixture or heavy fixture), a pedestrian and a fixture are greatly different from each other in the ON duration time of the front side collision detection sensor 1. The ON duration time of a pedestrian is remarkably short. Accordingly, it is determined whether or not the ON duration time of the sensor 1 is not larger than a predetermined ON duration time threshold. If not larger, the collision object is determined to be a pedestrian. Thus, a pedestrian can be discriminated from a light fixture and a heavy fixture. Further, when the front side collision detection sensor 1 is turned on and the rear side-collision detection sensor 2 is not turned on in a predetermined time (including a delay in the bumper), it can be determined to be a heavy fixture.

That is, in this discrimination method, a pedestrian can be discriminated from a light fallen object, a light fixture, and a heavy fixture. Further, only a heavy fixture can be determined. Thus, special protection control for only a heavy fixture can be instructed. This discrimination condition is shown in Table 2.

TABLE 2

|  | Combination of ON/OFF | | ON duration time ΔT | |
| --- | --- | --- | --- | --- |
|  | Front | Rear | Front | Rear |
| Light fallen object | OFF | OFF | — | — |
| Pedestrian | ON |  | ΔTs < Tsth2 | — |
| Light Fixture |  |  | Tsth2 ≦ ΔTs | — |
| Heavy Fixture |  | ON | — | — |

In Table 2, ΔTs denotes ON duration time of the front side collision detection sensor 1; and Tsth2, ON duration time threshold of the front side collision detection sensor 1.

Figure 24:
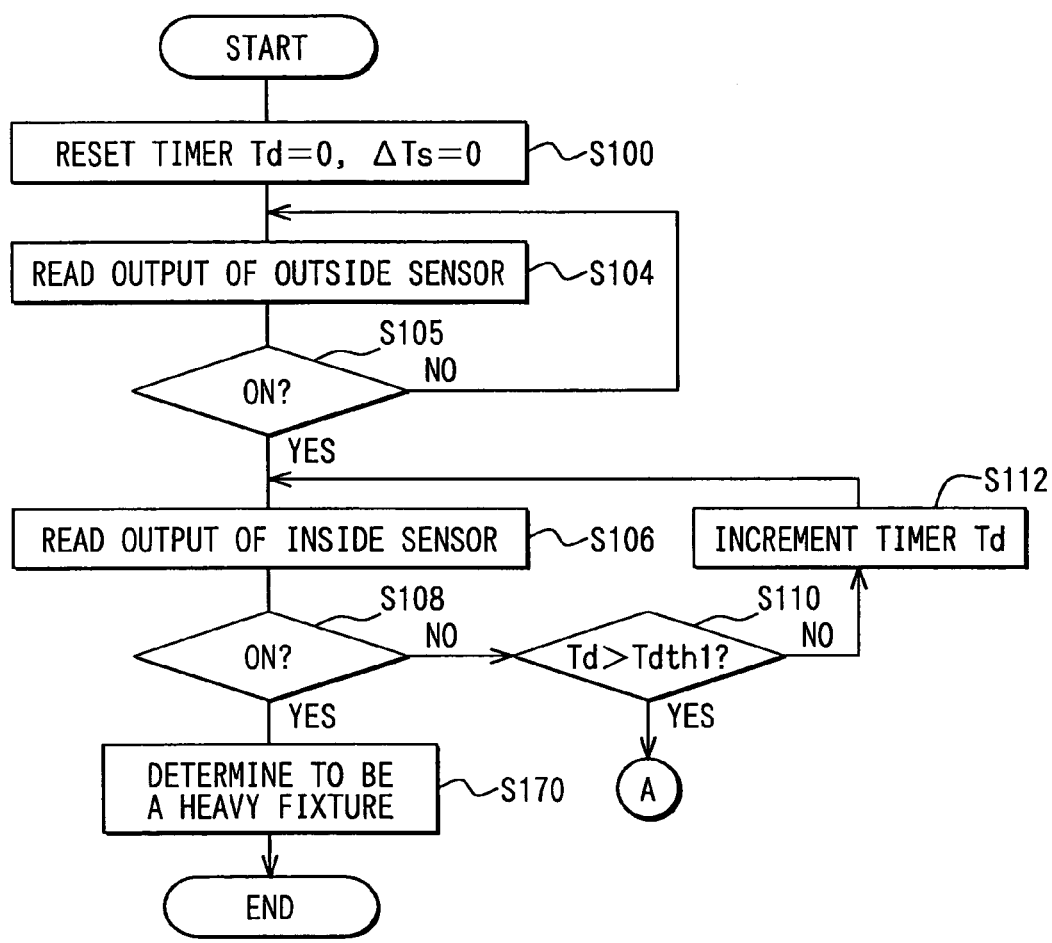
FIG. 24 is a flowchart showing a part of a second modification of collision object discrimination processing in the second embodiment.
Figure 25:
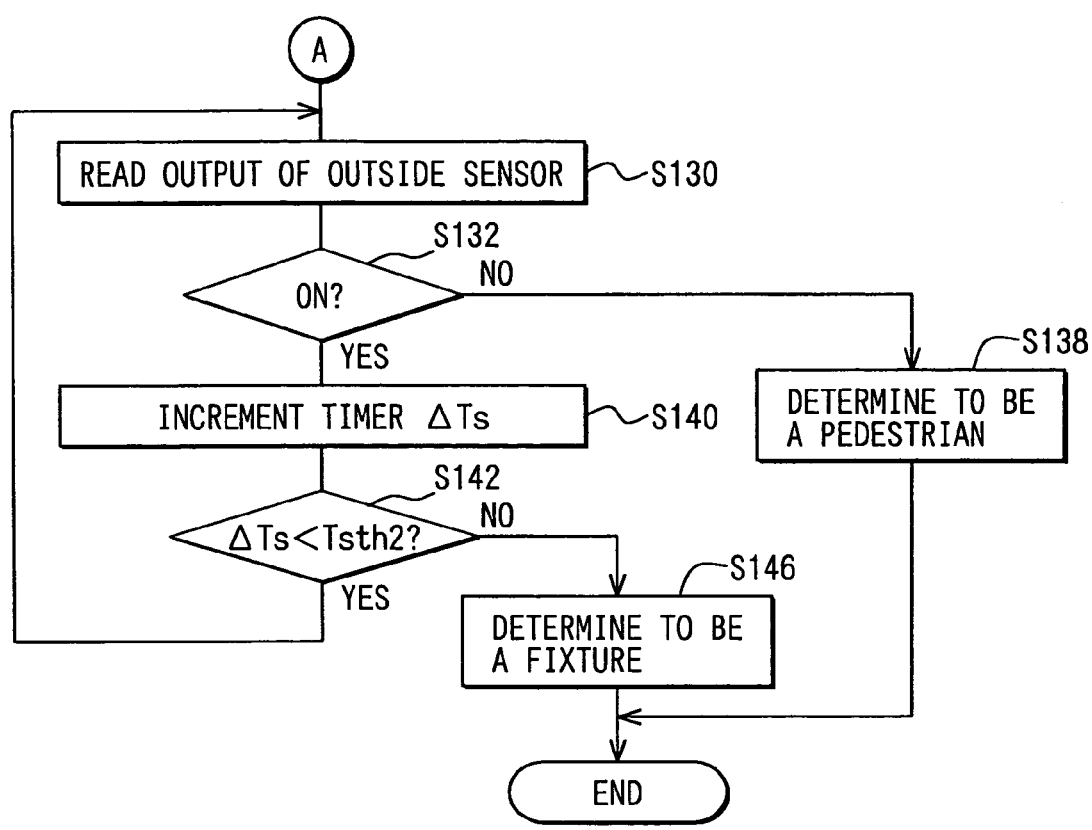
FIG. 25 is a flow chart showing the other part of the second modification of collision object discrimination processing in the second embodiment.

This modified discrimination operation carried out by the control unit 4 is shown as flowcharts in FIGS. 24 and 25. Tsth2 denotes a pedestrian ON duration threshold.

In this modification S170 is added following S108. Specifically, when the rear side collision detection sensor 2 is turned on, the collision object is determined to be a heavy fixture (S170). When the ON time difference Td exceeds the threshold Tdth1, the processing proceeds to S130.

Third Modification

This pedestrian discrimination method is performed using characteristics shown in FIGS. 16 and 19. In this method, a heavy fixture can be discriminated from others by the combination of the output levels of both sensors 1 and 2. When the pedestrian ON duration time is not larger than the ON duration time threshold of FIG. 16, a light fixture can be discriminated from a pedestrian and a light object (light fallen object).

In this case, a pedestrian and a light object cannot be discriminated from each other. A second ON duration time threshold is preferably provided between the waveforms of both. In the case where the ON duration time is less than the second ON duration time threshold, the collision object can be determined to be a light object. The discrimination condition is shown in Table 3.

TABLE 3

|  | Combination of ON/OFF | | ON duration time ΔT | |
| --- | --- | --- | --- | --- |
|  | Front | Rear | Front | Rear |
| Light fallen object | ON | OFF | Tsth3L ≦ ΔTs | — |
| Pedestrian |  |  | Tsth3L ≦ ΔTs ≦ Tsth3H | — |
| Light fixture |  |  | Tsth3H ≦ ΔTs | — |
| Heavy fixture |  | ON |  | — |

In Table 3, ΔTs denotes ON duration time of the front side collision detection sensor 1; Tsth3L, second ON duration time threshold of the front side collision detection sensor 1; and Tsth3H, second ON duration time threshold of the front side collision detection sensor (ON time difference threshold shown in FIG. 16).

Figure 26:
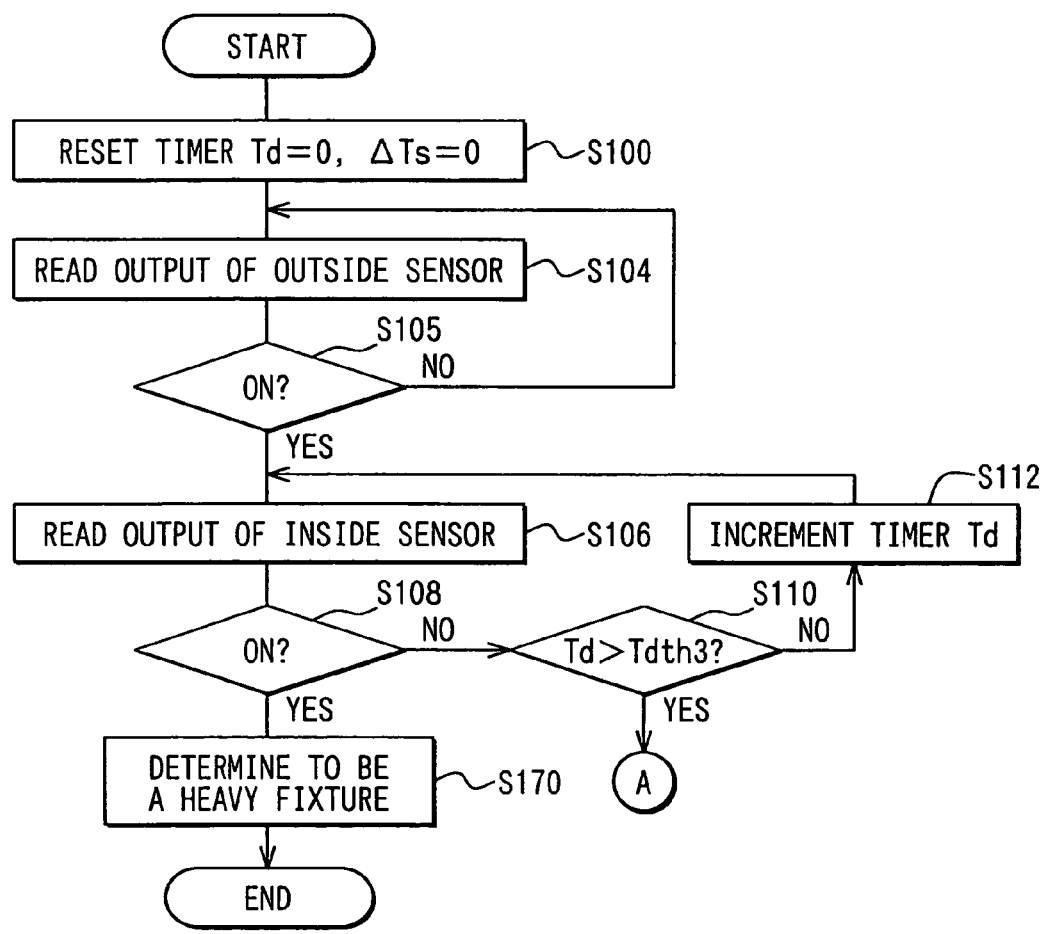
FIG. 26 is a flow chart showing a part of a third modification of collision object discrimination processing in the second embodiment.
Figure 27:
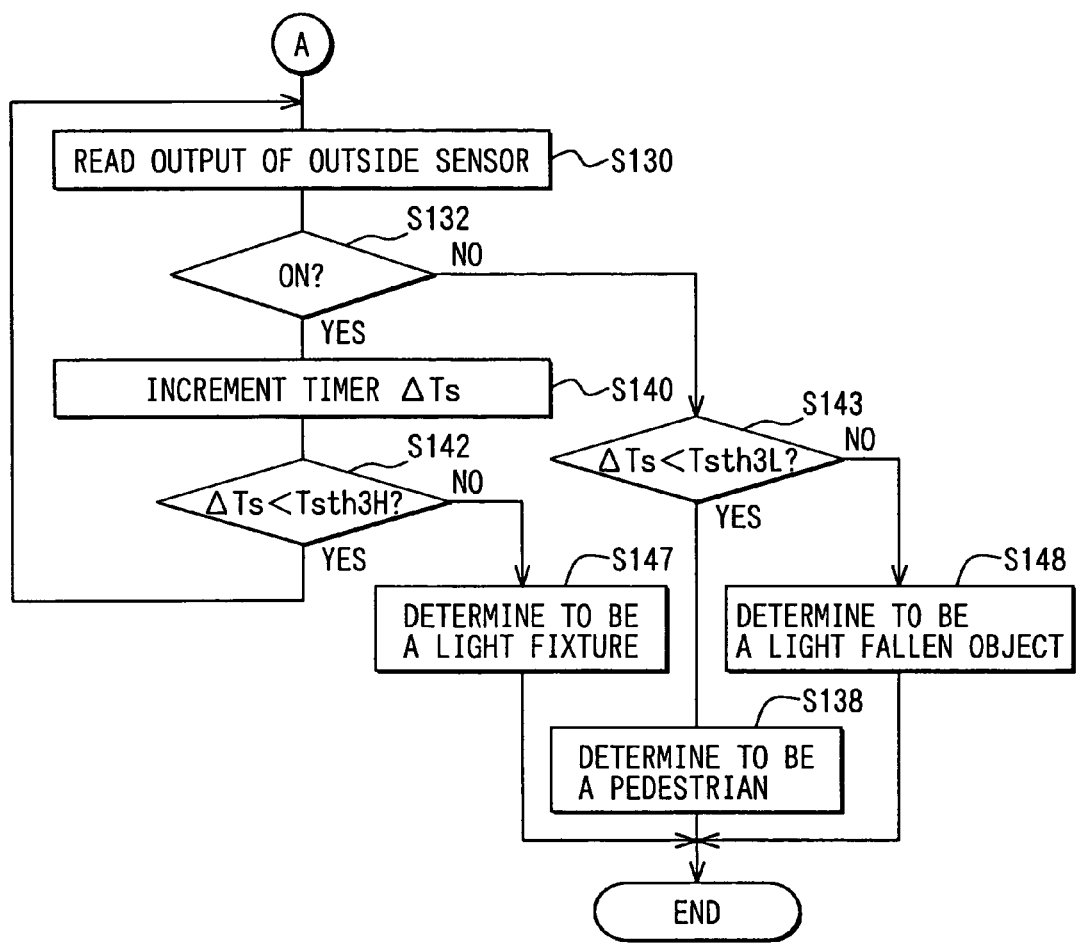
FIG. 27 is a flowchart showing the other part of the third modification of collision object discrimination processing in the second embodiment.

This modified discrimination operation carried out by the control unit 4 is shown as flowcharts in FIGS. 26 and 27.

In this modification, the threshold Tsth (S142) is changed to Tsth3 H, so that the collision object may be determined to be a light fixture if the ON duration time of the front side collision detection sensor 1 is not lower than the threshold Tsth3H. Further, S143 and S148 are added. The ON duration time of the front side collision detection sensor 1 is compared with the threshold Tsth3L. If the ON duration time is not lower than the threshold, the collision object is determined to be a light fallen object (S148).

Fourth Modification

This pedestrian discrimination method is performed using the characteristics shown in FIGS. 17 and 18.

A light object can be discriminated from others by the combination of the output levels of both sensors 1 and 2. Besides, when the pedestrian ON duration time of one of or both of the sensors 1 and 2 is not larger than the ON duration time threshold, a pedestrian can be discriminated from a light fixture and a heavy fixture. The discrimination condition is shown in Table 4.

TABLE 4

|  | Combination of ON/OFF | | ON duration time ΔT | |
| --- | --- | --- | --- | --- |
|  | Front | Rear | Front | Rear |
| Light fallen object | OFF | OFF | — | — |
| Pedestrian | ON | ON | ΔTs < Tsth4 | ΔTb < Tbth4 |
| Light fixture |  |  | Tsth4 ≦ ΔTs | Tbth4 ≦ ΔTb |
| Heavy fixture |  |  |  |  |

In Table 4, ΔTs denotes ON duration time of the front side collision detection sensor 1; Tsth4, ON duration time threshold of the front side collision detection sensor 1; ΔTb, ON duration time of the rear side collision detection sensor 2; and Tbth4, ON duration time threshold of the rear side collision detection sensor 2.

Figure 28:
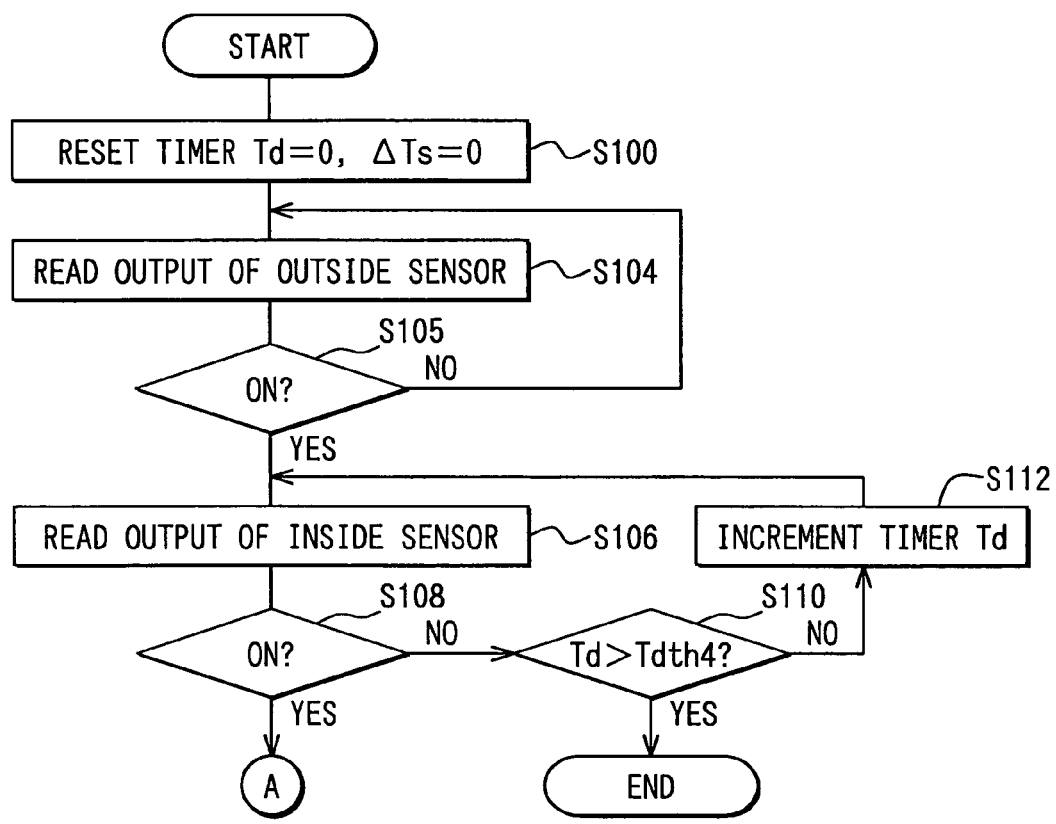
FIG. 28 is a flowchart showing a part of a fourth modification of collision object discrimination processing in the second embodiment.
Figure 29:
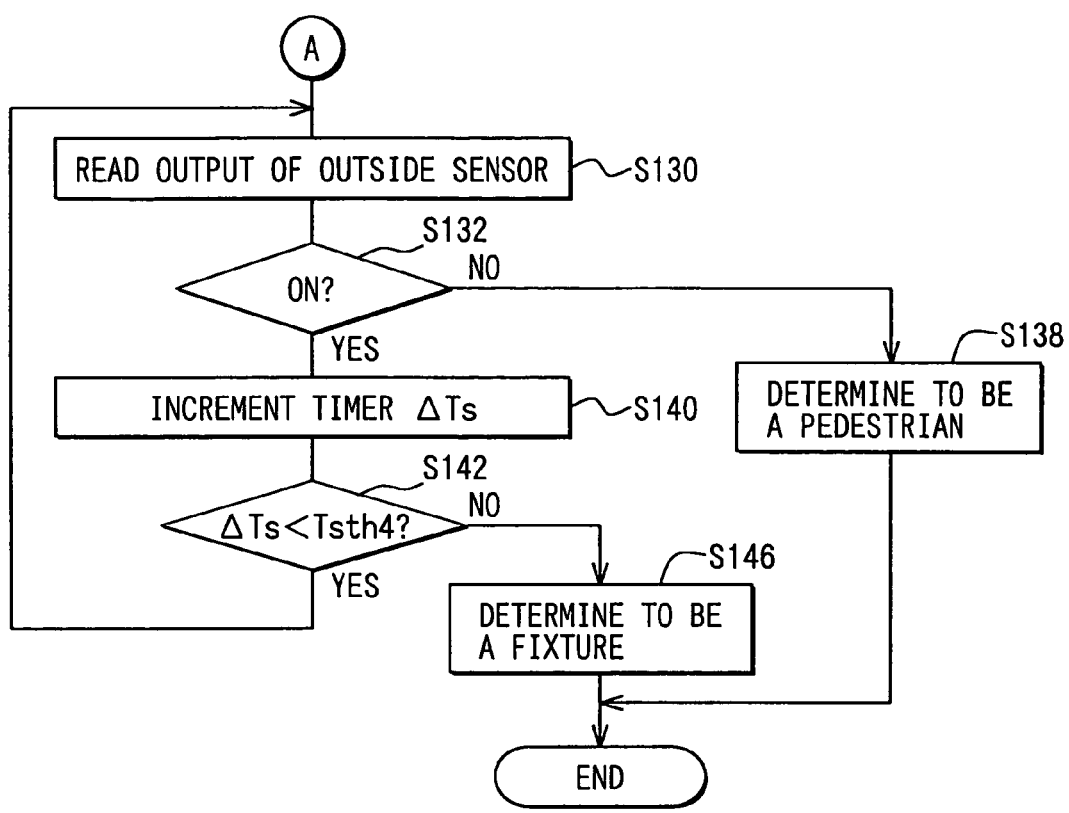
FIG. 29 is a flowchart showing the other part of the fourth modification of collision object discrimination processing in the second embodiment.

The collision object determination operation is carried out by the control unit 4 as shown in FIGS. 28 and 29. In this modification, the thresholds Tdth1 (S110) and Tsth1 (S142) in FIGS. 20 and 21 are changed to Tdth4 (S110) and Tsth4 (S142), respectively. Even if Td is higher than Tdth4, it is not determined to be a light fallen object.

Fifth Modification

According to this discrimination method, the ON duration time threshold Tsth1 and the ON duration time difference threshold Tdth1 are changed based on the signal from the vehicle speed sensor 5. That is, in the case where the vehicle speed V is high, since the load is large, there is a tendency that the ON duration time Ts becomes long. There is also a tendency that the ON duration time difference Td becomes short. Accordingly, when the ON duration time threshold is made large as the vehicle speed becomes high, amore precise discrimination can be realized. When the vehicle speed becomes low, the ON duration time threshold is shortened, and a discrimination result can be obtained quickly.

Figure 30:
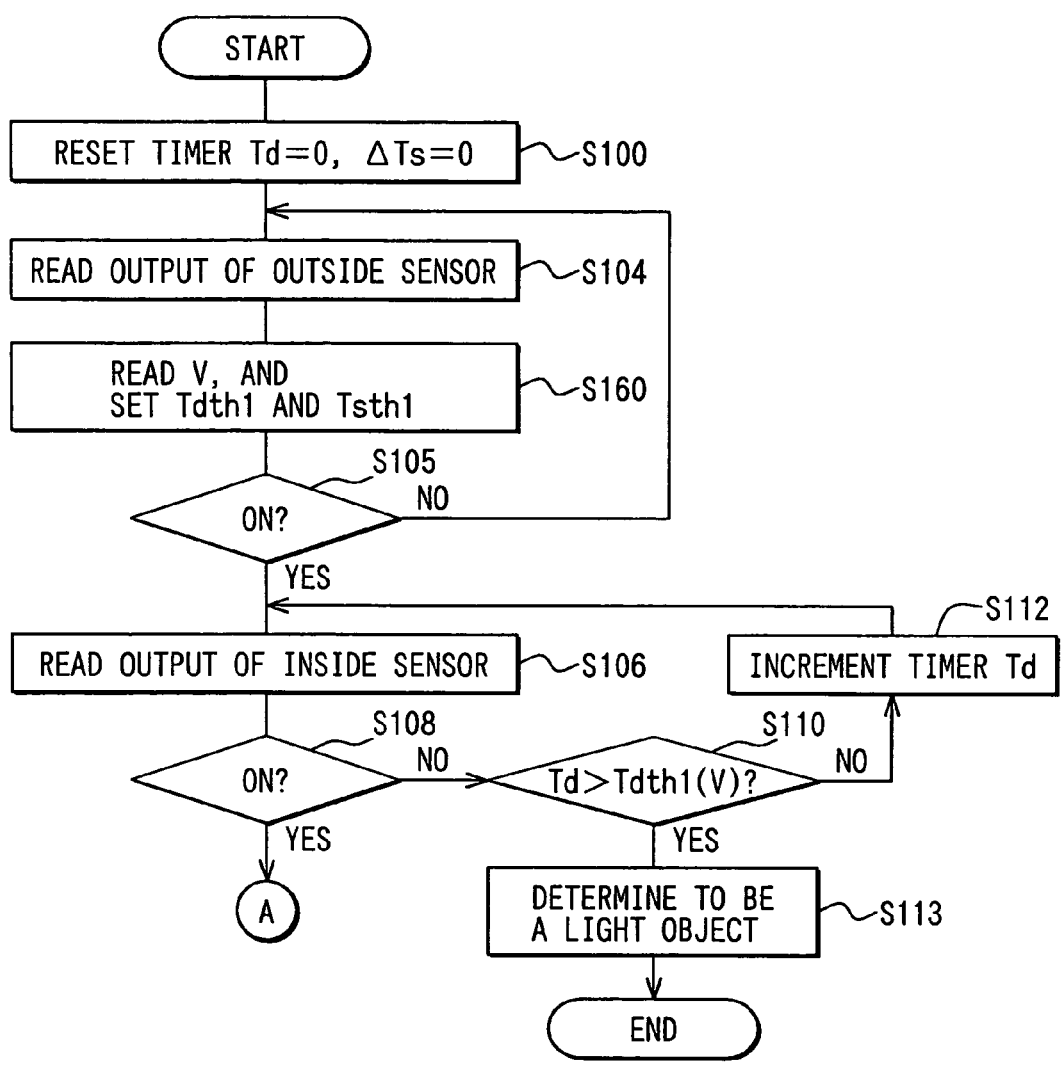
FIG. 30 is a flowchart showing a part of a fifth modification of collision object discrimination processing in the second embodiment.
Figure 31:
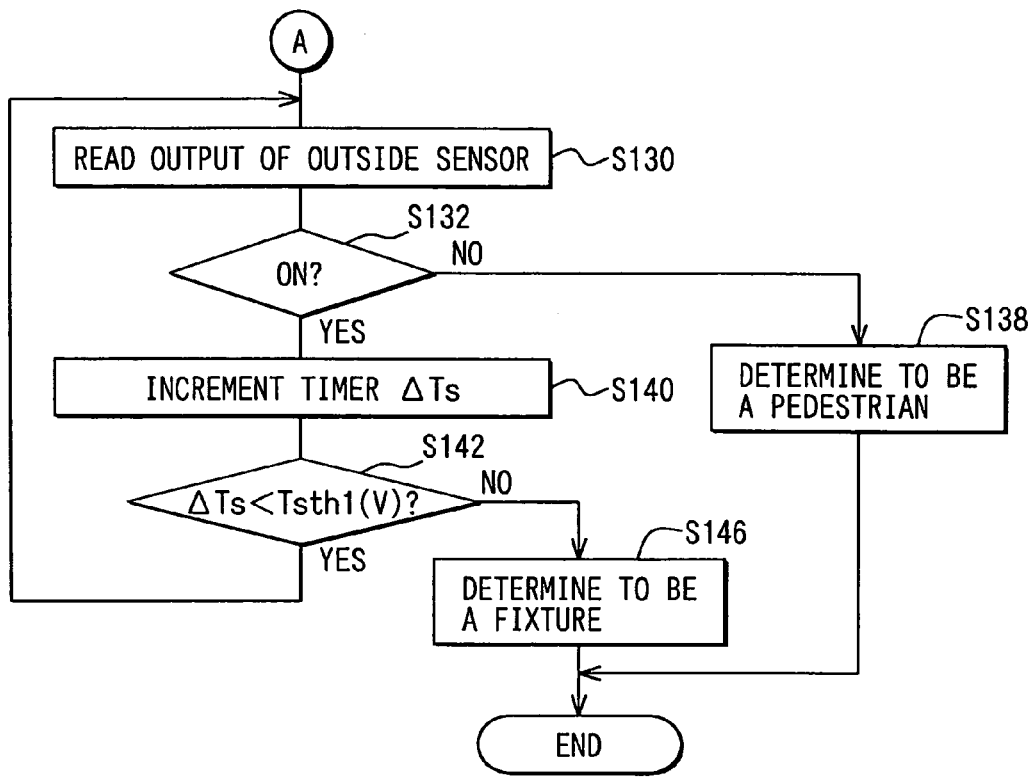
FIG. 31 is a flowchart showing the other part of the fifth modification of collision object discrimination processing in the second embodiment.
Figure 32:
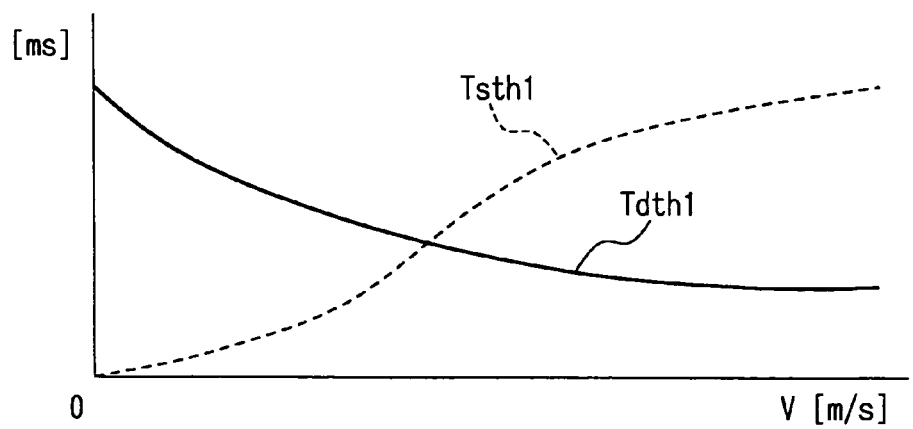
FIG. 32 is a characteristic diagram showing a relation between a vehicle speed and a threshold time in the fifth modification of collision object discrimination processing in the second embodiment.

This discrimination operation carried out by the control unit 4 is shown as flowcharts in FIGS. 30 and 31, and the relation between the vehicle speed and the ON duration time threshold or the ON time difference threshold is shown in FIG. 32. In FIGS. 30 to 32, Tsth1 denotes a pedestrian ON duration time threshold; and Tdth1, an ON time difference threshold, that is, an ON time difference threshold as a threshold ford is crimination of the length of the ON time difference as a delay time from the time point when the front side collision detection sensor 1 is turned on to the time point when the rear side collision detection sensor 2 is turned on.

In the flowcharts shown in FIGS. 30 and 31, S160 is added to the flowcharts shown in FIGS. 20 and 21. At S160, a vehicle speed V is read, and the ON duration time threshold Tsth1 of the front side collision detection sensor 1 and the ON time difference threshold Tdth1 are read from a data map storing characteristics shown in FIG. 32 according to the vehicle speed.

Sixth Modification

From FIGS. 16 and 17, it is understood that a fixture and a pedestrian are different from each other in the ON time difference Td. That is, in FIG. 17, in the case where the ON level is set to be higher, the ON time difference from the time point (FIG. 16) when the front side collision detection sensor 1 is turned on for a pedestrian to the time point (FIG. 17) when the rear side collision detection sensor 2 is turned on is longer than the ON time difference from the time point when the front side collision detection sensor 1 is turned on for a fixture to the time point when the rear side collision detection sensor 2 is turned on.

This is because at the collision with a pedestrian, especially a high frequency component of the load is greatly attenuated in the bumper and delay occurs. Accordingly, a pedestrian and a fixture can be discriminated from each other by the magnitude of the ON time difference.

Seventh Modification

From FIGS. 18 and 19, it is understood that a heavy fixture and the light fixture or a pedestrian are different from each other in the ON time difference. That is, in FIG. 19, in the case where the ON level is further lowered and is set so that the sensor is turned on for a pedestrian and the light fixture, the ON time difference from the time point (FIG. 18) when the front side collision detection sensor 1 is turned on for a heavy fixture to the time point (FIG. 19) when the rear side collision detection sensor 2 is turned on is shorter than the ON time difference from the time point when the front side collision detection sensor 1 is turned on for the light fixture or a pedestrian to the time point when the rear side collision detection sensor 2 is turned on. This is because at the collision with a heavy fixture, attenuation of the load, especially a high frequency component is small in the bumper.

Besides, the ON time difference of a pedestrian is longer than that of the light fixture. This is because, since a pedestrian is struck up, the waveform (containing many high frequency components) is such that the load is abruptly attenuated, so that the waveform becomes rather smooth by large attenuation of the high frequency components in the bumper, and the ON time difference becomes large. By using the ON time differences, the kind of the collision object can be quickly determined.

Third Embodiment

Figure 33:
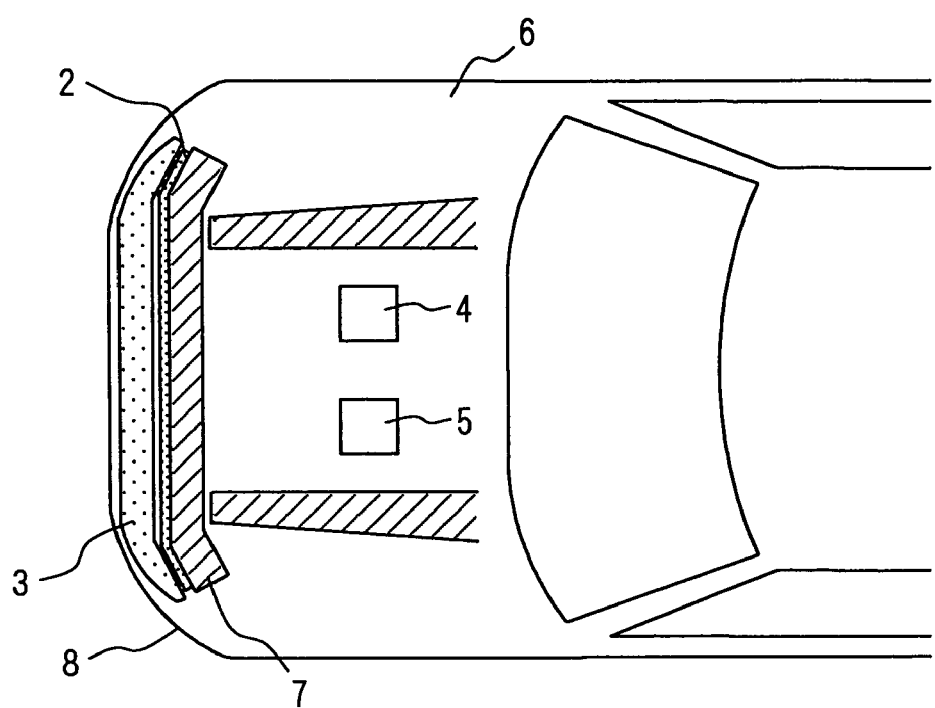
FIG. 33 is a schematic view showing an arrangement of the collision object discrimination apparatus according to the third embodiment of the present invention.

A collision object discrimination apparatus of the third embodiment will be described with reference to FIGS. 33 to 35. The collision object discrimination apparatus uses 64 film-like pressure-sensitive sensors (sensor cells) 201 to 232 and 201' to 232' as the collision load detection sensor 2. This collision load sensor 2 also operates as a collision width detection sensor shown in FIG. 1.

The sensor cells 201 to 232 and 201' to 232' are positioned between the reinforcing member 7 laterally provided in the front part of the vehicle body 6 and the bumper 3 disposed in front of the reinforcing member 7 and having a shock absorbing property and are laterally disposed at a constant pitch. However, they may be disposed between the bumper cover 8 and the bumper 3, or may be disposed to be embedded laterally in the inside of the bumper cover 8.

Figure 34:
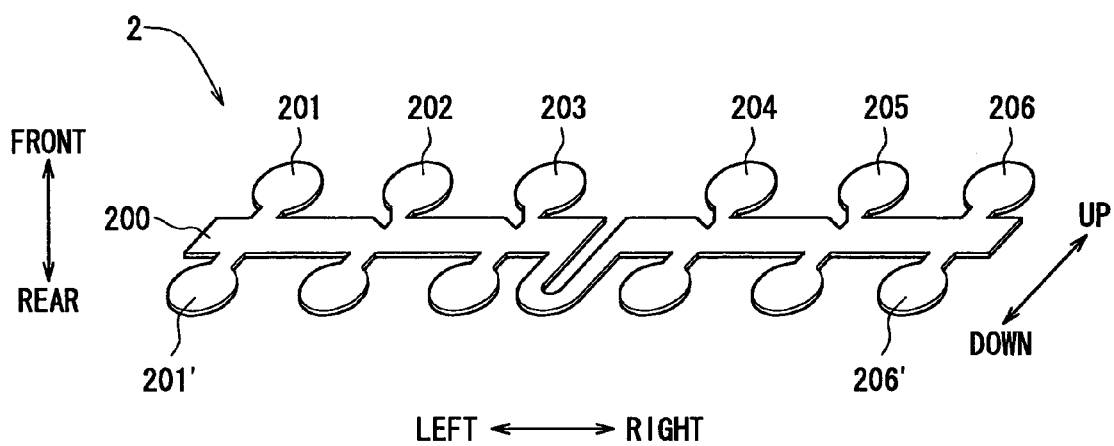
FIG. 34 is a schematic perspective view showing sensor cells used as the collision load detection sensor in the third embodiment.
Figure 35:
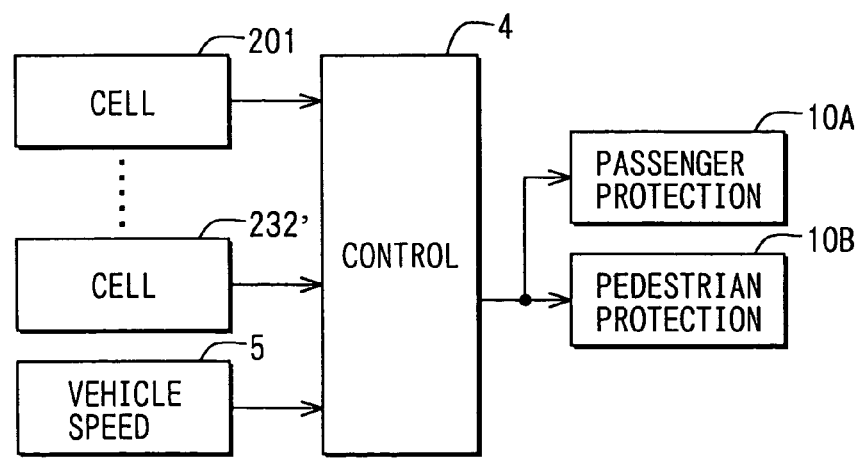
FIG. 35 is a block diagram showing the collision object discrimination apparatus in the third embodiment.

As shown in FIG. 34, the sensor cells 201 to 232 and 201' to 232' are attached to both side edges of a tape-like base 200, which is provided to extend in the lateral direction of a vehicle, at a constant pitch in the lateral direction, and are mutually integrated. The sensor cells 201 to 232 and 201' to 232' in FIG. 4 are known as film-like pressure-sensitive sensors or surface pressure sensors, and the tape-like base 200 and the sensor cells 201 to 232 and 201' to 232' form the collision load sensor 2.

The sensor cells 201 to 232 and 201' to 232' are respectively made of well-known surface pressure sensors. As the sensor cells 201 to 232 and 201' to 232', a conductive rubber type surface pressure sensor shown in FIG. 6 may be adopted in which a conductive particle-containing rubber layer is held between polyester films at the in sides of which electrode layers are formed. In addition, a conductive ink layer type surface pressure sensor may be adopted in which a well-known conductive ink layer is held between similar resin films having electrode layers. The structure and operation itself of this kind of film-like pressure-sensitive sensor is well known.

When a load is applied to the sensor cells 201 to 232 and 201' to 232' in the thickness direction, the electric resistance value of the conductive particle-containing rubber layer or the conductive ink layer is decreased. The electric resistance value between the pair of electrode layers at both sides of the variable resistance layer is decreased in accordance with the increase of the load.

In FIG. 34, the tape-like base 200 is constructed such that an upper polyester tape at the inside of which many signal lines are formed and a lower polyester tape are laminated through an insulating spacer made of a resin film. The insulating spacer electrically insulates the signal lines of the two polyester tapes facing each other. In the sensor cells 201 to 232 and 201' to 232', instead of the insulating spacer, the conductive ink layer or the conductive particle-containing rubber layer is held between the upper polyester tape and the lower polyester tape. The pairs of the electrode layers of the sensor cells. 201 to 232 and 201' to 232' are respectively formed by extending the signal lines of the upper polyester tape and the signal lines of the lower polyester tape.

However, ones of the respective pairs of the electrode layers of the sensor cells 201 to 232 and 201' to 232' are respectively formed of a common conductive layer and are made to have the same potential. The others of the pairs of the electrode layers of the sensor cells 201 to 232 and 201' to 232' are individually connected to a total of 64 signal lines (not shown) which are electrically insulated from each other and are provided on the tape-like base 200 to extend in the lateral direction. Here, in FIG. 34, the sensor cells 201' to 232' are preferably shifted in the lateral direction by half of one sensor cell pitch with respect to the sensor cells 201 to 232 adjacently disposed up and down across the tape-like base 200, if the resolution in the lateral direction should be doubled. Naturally, the sensor cells may be disposed at only one side of the tape-like base 200, or the collision load sensors 2 each made of the sensor cells 201 to 232 and 201' to 232' and the tape-like base 200 may be disposed up and down and in parallel to each other.

A constant voltage is applied to the signal lines extended from the sensor cells 201 to 232 and 201' to 232' through different load resistance elements, and potentials of connection points of the load resistance elements and the signal lines are read into an A/D converter through a multiplexer at high speed and time sequentially. The respective signal lines may be time sequentially connected to the load resistance elements through the multiplexer. Parallel processing of plural sensor output signals or sequential processing itself using the multiplexer is well known in a circuit technology.

Figure 36:
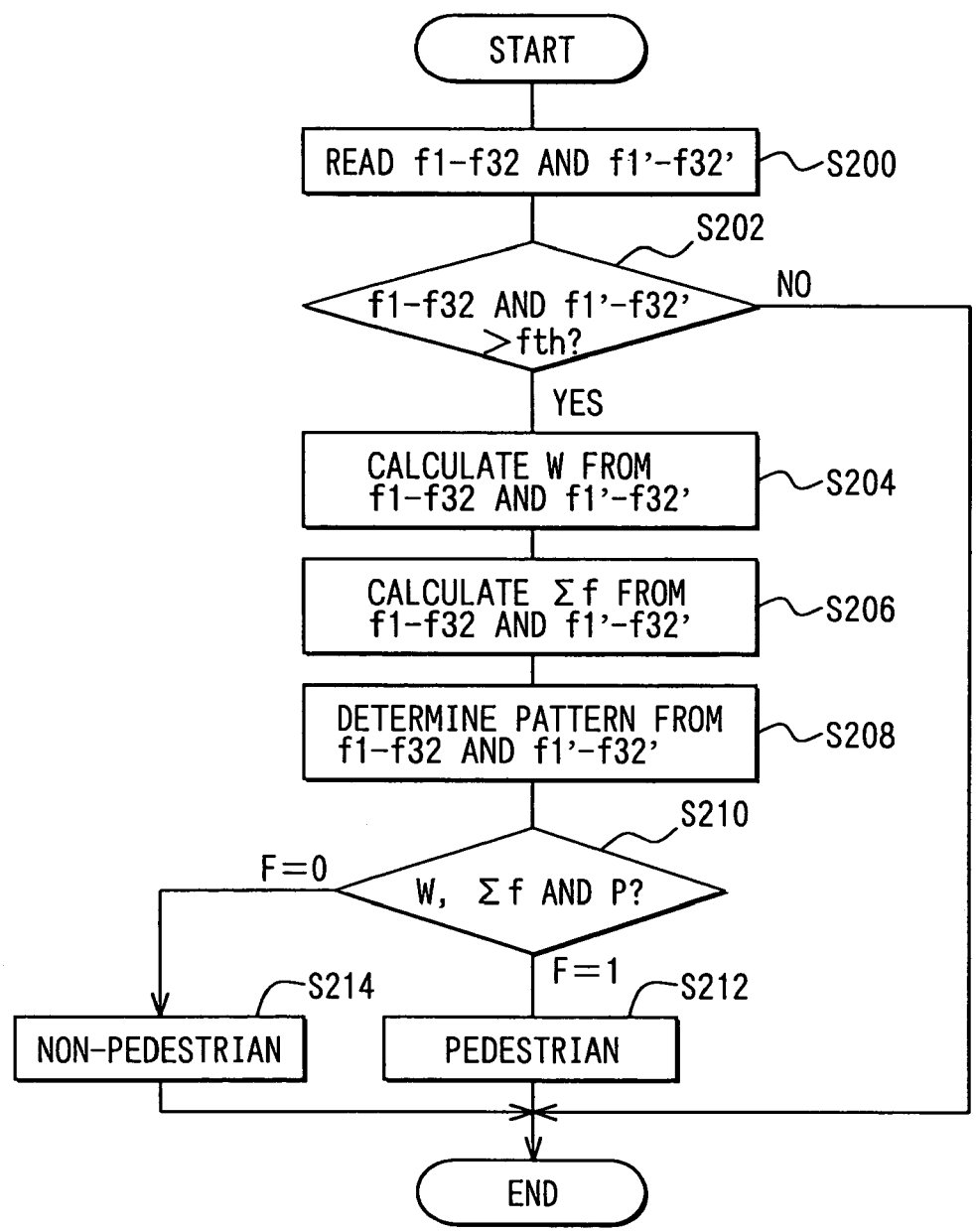
FIG. 36 is a flowchart showing a pedestrian discrimination processing in the third embodiment.

Hereinafter, a pedestrian discrimination method using output signals of the sensor cells 201 to 232 and 201' to 232' will be described with reference to a flowchart shown in FIG. 36. The pedestrian discrimination routine according to this flowchart is performed at least every several milliseconds.

First, collision loads f1 to f32 are read from the sensor cells 201 to 232 and collision loads f1' to f32' are read from the sensor cells 201' to 232' (S200). If one or more of them exceed a predetermined threshold (fth) (S202), it is determined that the collision occurred and the processing proceeds to step S204. If not higher than the threshold fth, it is determined that no collision occurred, and the processing ends.

At step S204, among the collision loads exceeding the threshold (fth), the collision load outputted from the sensor cell at the leftmost position and the collision load outputted from the sensor cell at the rightmost position are extracted. The width, in the lateral direction, of the two sensor cells for outputting the two collision loads is determined to be a collision width W.

Next, all the collision loads exceeding the threshold (fth) are added to calculate a collision load sum $\Sigma f$. This sum $\Sigma f$ is regarded as the collision load applied to the vehicle (S206) All of a total of 64 collision loads, that is, the collision loads f1 to f32 and the collision loads f1' to f32' may be added to obtain the collision load sum $\Sigma f$. Thereafter, a pattern matching processing is performed in which a load distribution pattern, in the lateral direction, of the collision loads of the respective sensor cells in the range of the collision width is extracted. This is compared with a predetermined number of load distribution patterns P, which are determined experimentally and stored in a memory. The most approximate one of the stored load distribution patterns is determined to be a load distribution pattern P at this time (S208).

Next, the respective values of W, $\Sigma f$ and P are substituted or compared with a data map, which stores combinations of the collision width W, the collision load sum $\Sigma f$, and the load distribution pattern P at various pedestrian collisions. It is determined whether the substituted values are coincident with the combination of the stored values (S210). In the case where they are coincident with each other, it is determined that the collision object at this time is a pedestrian (S212). When they are not coincident with each other, it is determined that the collision object at this time is not a pedestrian (S214), and the processing returns to the main routine.

Figure 37:
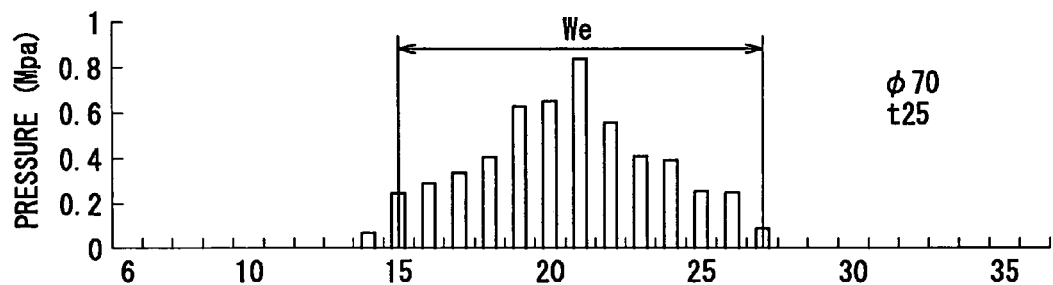
FIG. 37 is a graph showing a load distribution pattern of an object equivalent to a pedestrian in the third embodiment.
Figure 38:
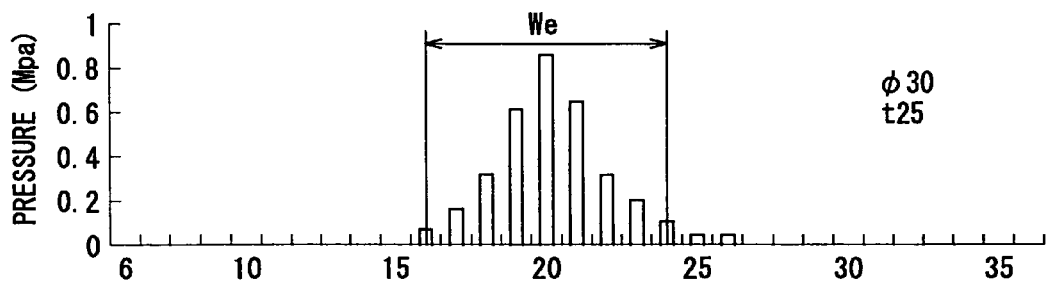
FIG. 38 is a graph showing a load distribution pattern of a collision object other than a pedestrian in the third embodiment.

FIG. 37 shows a typical distribution pattern of output loads (surface pressures) of the respective sensor cells in the case where a collision occurs with an impacter (urethane foam with a thickness of 25 mm is wound on a straight metal pole with a diameter of 70 mm) equivalent to a leg of a pedestrian at a predetermined vehicle speed value. FIG. 38 shows a distribution pattern of output loads (surface pressures) of the respective sensor cells in the case where a collision occur with an impacter (urethane foam with a thickness of 25 mm is wound on a straight metal pole with a diameter of 30 mm) not equivalent to a leg of a pedestrian at the same vehicle speed value. In FIGS. 37 and 38, a straight line having arrows at both ends indicates a lateral width W1 where a surface pressure value not less than a predetermined common threshold occurs. In the case where this lateral width W1 is less than a certain value, a collision object can be determined not to be a leg of a pedestrian.

Figure 39:
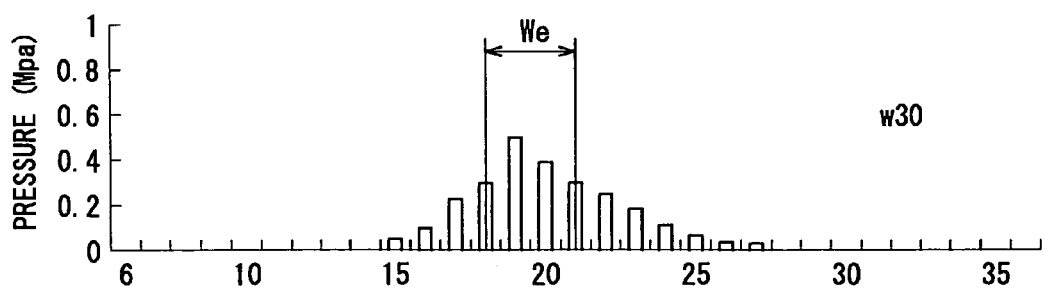
FIG. 39 is a graph showing a load distribution pattern of a collision object other than a pedestrian in the third embodiment.

FIG. 39 shows a distribution pattern of output loads (surface pressures) of the respective sensor cells in the case where a collision occurs with an impacter (metal plate with a width of 30 mm) not equivalent to a leg of a pedestrian at the same vehicle speed as the case of FIGS. 37 and 38. In FIGS. 37 and 39, a straight line having arrows at both ends indicates a lateral width W1 where a surface pressure value not less than a common predetermined threshold occurs. In the case where the lateral width W1 is less than a certain value, a collision object can be determined not to be a leg of a pedestrian.

The predetermined value can be changed by means of the collision load sum $\Sigma f$, collision load maximum value or the like in addition to the vehicle speed. Moreover, in FIGS. 37 to 39, a determination may be made as to whether a collision object is a leg of a pedestrian by shape comparison of the distribution pattern of surface pressure values detected by the respective sensor cells.

First Modification

In the third embodiment, the threshold fth may be made a function value having a positive correlation to the vehicle speed detected by the speed sensor 5, or the load distribution pattern P may be compressed or expanded according to the vehicle speed.

Second Modification

Figure 40:
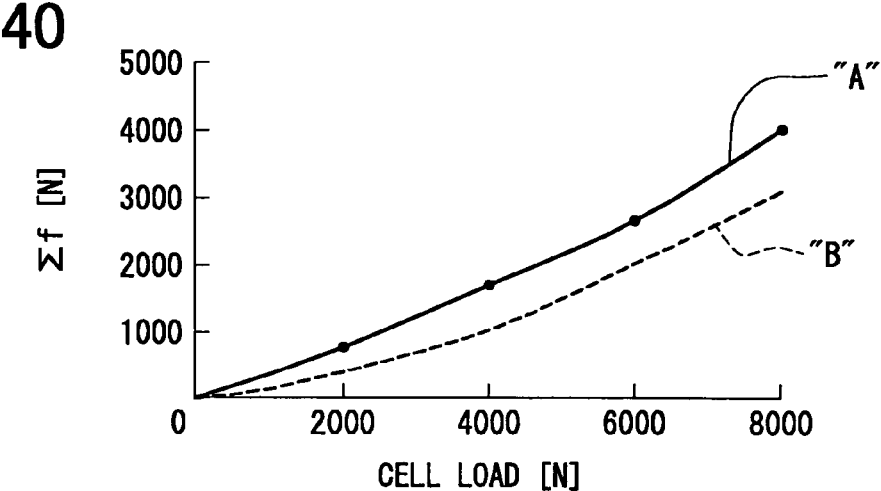
FIG. 40 is a characteristic graph showing a difference in detection sensitivity according to the arrangement position of a collision load detection sensor between the third embodiment and its modification.

In the third embodiment, the sensor cells 201 to 232 and 201' to 232' are deformed rearward at the time of collision by the deformation of the bumper 3, and hence the detected collision load becomes small by that. Therefore, the sensor cells 201 to 232 and 201' to 232' may be disposed between the bumper cover 8 and the bumper 3. A broken line B of FIG. 40 indicates a relation between a collision load sum $\Sigma f$ and added collision loads in the case of the third embodiment, where the sensor cells 201 to 232 and 201' to 232' are disposed between the bumper 3 and the reinforcing member 7. A solid line A of FIG. 40 indicates a relation between a collision load sum $\Sigma f$ and added collision loads in the case of the second modification where the sensor cells 201 to 232 and 201' to 232' are disposed between the bumper cover 8 and the bumper 3.

Third Modification

Figure 41:
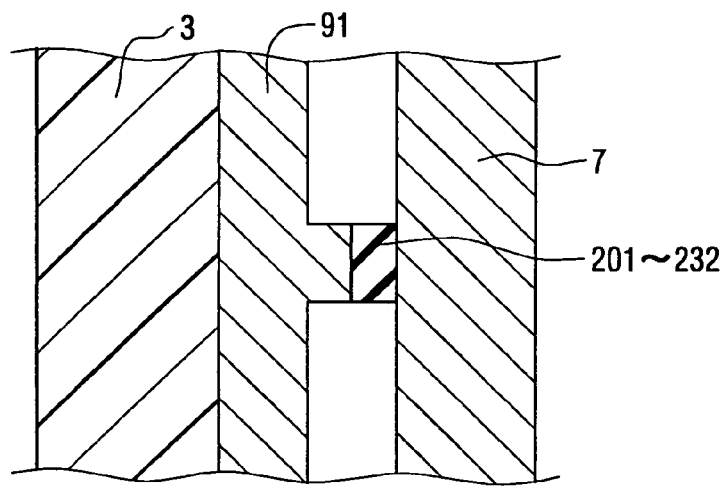
FIG. 41 is a schematic longitudinal sectional view of a vicinity of the collision load detection sensor according to a modification of the third embodiment.
Figure 42:
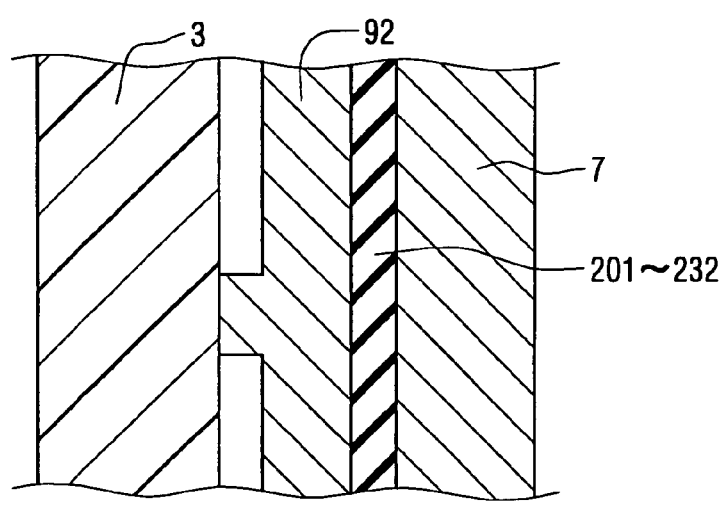
FIG. 42 is a schematic longitudinal sectional view of a vicinity of the collision load detection sensor according to a modification of the third embodiment.

In the case where the magnitude of an input load per unit area from the bumper 3 to the sensor cells 201 to 232 and 201' to 232' and the dynamic range of the sensor cells 201 to 232 and 201' to 232' do not coincide with each other excellently, they can be made coincident with each other by providing a load concentration plate 91 or a load dispersion plate 92 as shown in FIGS. 41 and 42, respectively.

According to the third embodiment and its modifications, by the film-like pressure-sensitive sensors 201 to 232 and 201' to 232' disposed in the lateral direction and fitted to the bumper 3, it is possible to detect the existence of collision, the collision load sum, the collision width, the temporal change of collision load, the collision position in the lateral direction, and the load distribution pattern in the lateral direction accurately and at high speed. Therefore, it becomes possible to perform the pedestrian discrimination with high accuracy by using one kind of sensors.

Fourth Embodiment

Figure 43:
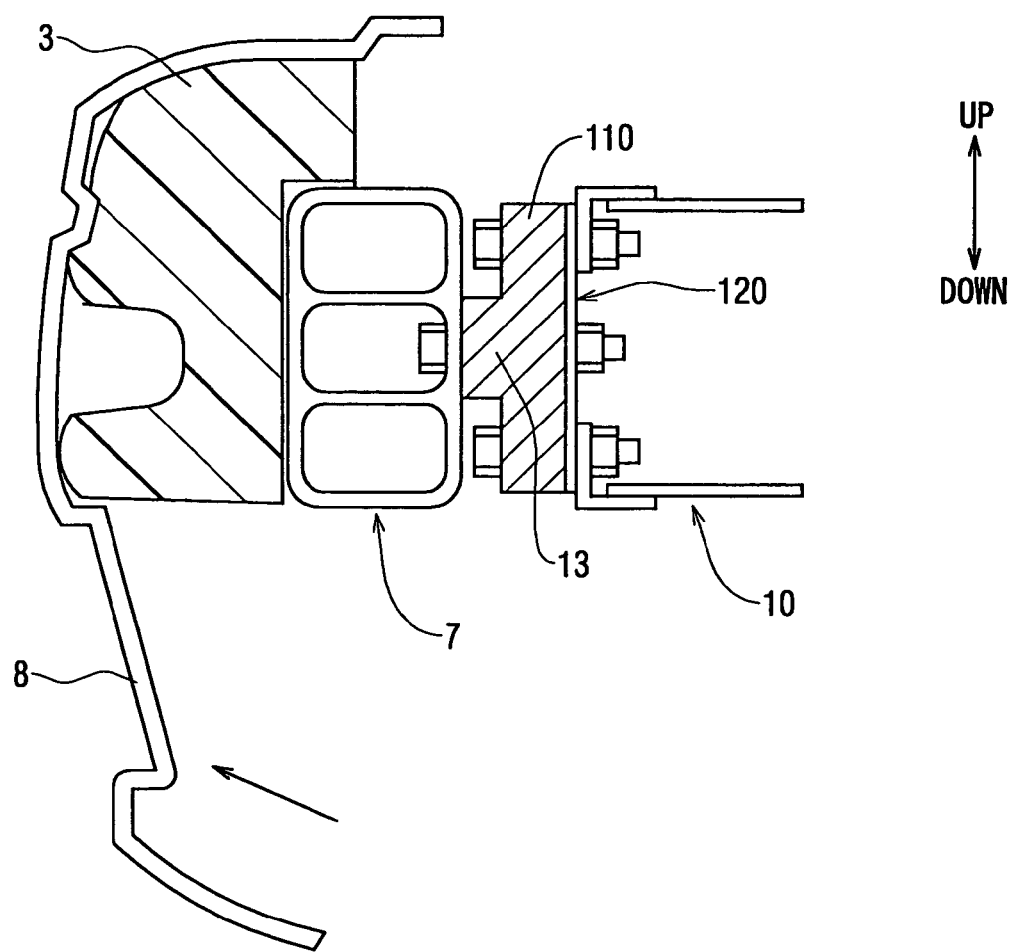
FIG. 43 is a schematic longitudinal sectional view of a vicinity of the collision load detection sensor according to the fourth embodiment of the present invention.

In the fourth embodiment shown in FIG. 43, the collision load detection sensor 2 is disposed as shown in FIG. 8 and is constructed as a distortion gauge sensor 120. A pair of side members 10 is disposed in the front-back direction. At the front end of the side members 10, the reinforcing member 7 is provided laterally. The distortion gauge sensor 120 is fitted on the rear surface of a support block 110.

The support block 110 is made of a thick plate member whose front has a projection 13 fastened by a bolt to the center part in the vertical direction of the rear surface of the reinforcing member 7 which is a metal rectangular cylindrical member extended in the lateral direction. The upper end and the lower end of the rear surface of the support block 110 are fastened by bolts to the upper end and the lower end of the high rigidity side members 10. When a collision load is applied to the center part in the vertical direction of the support block 110 from the reinforcing member 7, the support block 110 is bent. Since the distortion gauge sensor 120 is fitted on the rear surface of the support block 110, the distortion gauge sensor 120 can detect the deformation of the support block, which is changed according to the magnitude of the collision load, as a change in electric resistance value. In FIG. 43, although the upper end and the lower end of the support block 110 is supported by the side member 10, the left end and the right end of the support block 110 may be supported by the side members 10 instead.

According to this embodiment, a surface pressure sensor need not disposed over the front surface in the lateral direction of the bumper 3, and even in the case where the collision load occurs at any position in the lateral direction of the bumper cover 8, the collision load is finally transmitted to a pair of right and left high rigidity side members 10. Thus, the collision load can be certainly detected by a small number of sensors. That is, when the distortion gauge sensors 120 or collision sensors equivalent thereto are provided at the front surfaces of the two side members 10, and the total of the detection loads is calculated, the collision load can be certainly detected. In addition, the loads detected by the right and left collision load sensors may be separately determined. Further, the collision position in the lateral direction can also be determined by the time difference or the magnitude difference of the output waveforms of the two collision sensors.

The present invention should not be limited to the disclosed embodiments and modifications, but may be implemented in many other ways without departing from the spirit of the invention.

What is claimed is:

1. A collision object discrimination apparatus for vehicles, comprising:
    a collision load detection sensor fitted to a vehicle body for detecting a collision load applied from a collision object in a longitudinal direction of the vehicle body;
    collision object discrimination means for discriminating kinds of the collision object based on an output of the collision load detection sensor; and
    a collision width detection sensor fitted to the vehicle body for detecting a collision width of the collision object in a lateral direction of the vehicle body; wherein
    the collision object discrimination means attains a collision object discrimination based on an output of the collision width detection sensor in addition to the output of the collision load sensor; and
    the collision width detection sensor is disposed at a front side of the bumper;
    the collision load detection sensor is fitted to front ends of a pair of side members of a vehicle; and
    the side members are provided in the longitudinal direction of the vehicle behind a bumper of the vehicle so that the sensor is provided between the side members and the bumper.

2. The collision object discrimination apparatus for vehicles according to claim 1, wherein the collision object discrimination means calculates rigidity of the collision object from the outputs of both sensors, and discriminates the kind of the collision object based on the rigidity of the collision object.

3. The collision object discrimination apparatus for vehicles according to claim 2, wherein the collision object discrimination means discriminates the collision object based on the rigidity of the collision object and the collision width.

4. The collision object discrimination apparatus for vehicles according to claim 3, wherein:
    the collision object discriminating means calculates a mass of the collision object; and
    the collision object discriminating means discriminates the collision object based on the mass, the rigidity and the collision width.

5. The collision object discrimination apparatus for vehicles according to claim 2, wherein:
    the collision width detection sensor detects the collision width with respect to a bumper of the vehicle body; and
    the collision object discrimination means calculates an amount of deformation of the bumper in the longitudinal direction based on the collision width and the collision load, and calculates the rigidity of the collision object as a deformation resistance of the collision object per unit width based on the amount of deformation, the collision load and the collision width.

6. A collision object discrimination apparatus for vehicles, comprising:
    a collision load detection sensor fitted to a vehicle body for detecting a collision load applied from a collision object in a longitudinal direction of the vehicle body;
    collision object discrimination means for discriminating kinds of the collision object based on an output of the collision load detection sensor; and
    a collision width detection sensor fitted to the vehicle body for detecting a collision width of the collision object in a lateral direction of the vehicle body; wherein
    the collision object discrimination means attains a collision object discrimination based on an output of the collision width detection sensor in addition to the output of the collision load sensor; and
    the collision width detection sensor includes:
    a pair of conductive members spaced apart from each other by a specified interval in the longitudinal direction of the vehicle body and extended in the lateral direction of the vehicle body, the pair of conductive members being brought into electrical contact with each other at a collision portion; and
    an arithmetic circuit part detecting a signal corresponding to a voltage drop between both left ends of the pair of conductive members and a signal corresponding to a voltage drop between both right ends of the pair of conductive members, and calculating the collision width based on both signals.

7. The collision object discrimination apparatus for vehicles according to claim 6, wherein:
    the pair of conductive members have respective resistances substantially equal to each other.

8. A collision object discrimination apparatus for vehicles comprising:
- a first collision detection sensor provided on a front side of a buffer member to detect a collision load;
- a second collision detection sensor provided on a rear side of the buffer member to detect a collision load; and
- collision object discrimination means for discriminating a collision object based on a difference in level change timings of output signals of the first collision detection sensor and the second collision detection sensor.

9. A collision object discrimination apparatus for vehicles comprising:
- a first collision detection sensor provided on a front side of a buffer member to detect a collision load;
- a second collision detection sensor provided on a rear side of the buffer member to detect a collision load; and
- collision object discrimination means for discriminating a collision object based on level change timings of output signals of the first collision detection sensor and the second collision detection sensor; wherein:
- the first collision detection sensor includes a first pair of conductive members and a detection circuit part for detecting the collision based on an electric resistance change between the first pair of conductive members, the first pair of conductive members being spaced apart from each other by a specified interval in the longitudinal direction and brought into electrical contact with each other at a collision portion; and
- the second collision detection sensor includes a second pair of conductive members and a detection circuit part for detecting the collision based on an electric resistance change between the second pair of conductive members, the second pair of conductive members being spaced apart from each other by a specified interval in the longitudinal direction and brought into electrical contact with each other at the collision portion.

10. A collision object discrimination apparatus for vehicles comprising:
- a first collision detection sensor provided on a front side of a buffer member to detect a collision load;
- a second collision detection sensor provided on a rear side of the buffer member to detect a collision load; and
- collision object discrimination means for discriminating a collision object based on level change timings of output signals of the first collision detection sensor and the second collision detection sensor; wherein the collision object discrimination means measures time periods in which the output signals of the first collision detection sensor and the second collision detection sensor exceed a threshold level, respectively, measures a time period between time points at which the output signals of the first collision detection sensor and the second collision detection sensor exceed the threshold level, respectively, and discriminates the collision object based on the measured three time periods.

11. The collision object discrimination apparatus for vehicles according to claim 10, further comprising:
- a speed sensor for detecting a vehicle speed,
- wherein the collision object discrimination means changes collision object discrimination operation thereof based on the vehicle speed.

12. A collision object discrimination apparatus for vehicles comprising:
- a collision load detection sensor fitted to a vehicle body for detecting a collision load applied from a collision object in a longitudinal direction of the vehicle body; and
- collision object discrimination means for discriminating kinds of the collision object based on an output of the collision load detection sensor; wherein
- the collision load detection sensor includes a plurality of film-like pressure-sensitive sensors disposed on the bumper at least in a vehicle lateral direction at a predetermined pitch for respectively outputting load signals changing based on the collision load;
- the collision object discrimination means adds the load signals outputted by the respective film-like pressure-sensitive sensors to calculate the collision load; and
- the collision object discrimination means extracts a distribution pattern of the collision load in the vehicle lateral direction based on the load signals outputted by the respective pressure-sensitive sensors, and discriminates the collision object as a pedestrian if the extracted distribution pattern is coincident with a stored distribution pattern of a pedestrian.

13. The collision object discrimination apparatus according to claim 12, wherein the collision load detection sensor detects a collision width based on the load signals outputted by the film-like pressure-sensitive sensors respectively.

* * * * *